US012312003B2

(12) United States Patent
Abe et al.

(10) Patent No.: US 12,312,003 B2
(45) Date of Patent: May 27, 2025

(54) WORK VEHICLE AND METHOD FOR CONTROLLING WORK VEHICLE

(71) Applicant: Kubota Corporation, Osaka (JP)

(72) Inventors: Daiki Abe, Sakai (JP); Ryota Hamamoto, Sakai (JP); Yuki Bunryo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 598 days.

(21) Appl. No.: 17/844,071

(22) Filed: Jun. 20, 2022

(65) Prior Publication Data

US 2023/0044116 A1 Feb. 9, 2023

(30) Foreign Application Priority Data

Aug. 5, 2021 (JP) ................................ 2021-129066
Apr. 25, 2022 (JP) ................................ 2022-071652

(51) Int. Cl.
*B62D 11/04* (2006.01)
*B62D 11/00* (2006.01)
*E02F 9/22* (2006.01)

(52) U.S. Cl.
CPC ............ *B62D 11/04* (2013.01); *B62D 11/005* (2013.01); *E02F 9/225* (2013.01); *E02F 9/2292* (2013.01); *E02F 9/2296* (2013.01)

(58) Field of Classification Search
CPC ...................................................... B62D 11/04
See application file for complete search history.

(56) References Cited

U.S. PATENT DOCUMENTS

| | | | |
|---|---|---|---|
| 10,975,893 B2 * | 4/2021 | Fukuda .................. | F15B 11/16 |
| 11,377,822 B2 * | 7/2022 | Takahashi ................ | E02F 9/22 |
| 11,873,624 B2 * | 1/2024 | Fukuda .................. | F15B 15/00 |
| 12,006,659 B2 * | 6/2024 | Fukuda ................ | E02F 9/2292 |
| 2021/0123215 A1 | 4/2021 | Fukuda et al. | |

FOREIGN PATENT DOCUMENTS

| | | |
|---|---|---|
| JP | 2714821 B2 | 1/1990 |
| JP | 2021-008739 | 1/2021 |
| JP | 2021-067147 | 4/2021 |
| JP | 2022-033100 | 2/2022 |

* cited by examiner

*Primary Examiner* — Kevin Hurley
(74) *Attorney, Agent, or Firm* — MORI & WARD, LLP

(57) ABSTRACT

A method for controlling a work vehicle includes driving a first hydraulic pump and a second hydraulic pump by an engine to supply hydraulic fluid to a first hydraulic motor and a second hydraulic motor, respectively, to drive a first traveling device and a second traveling device, respectively. An operation state of a direction input device to operate a traveling direction of the work vehicle is detected. Based on the operation state detected, whether or not a traveling state of the work vehicle is a turning state. When it is determined that the traveling state is the turning state, a rotation command to decrease a target rotational speed of the engine from a first rotational speed to a second rotational speed is output.

28 Claims, 14 Drawing Sheets

1
2
2R
2L
3 (3R)
3 (3L)
4
41
42 (42R)
42 (42L)
42C
43
45 (45R)
45 (45L)
46 (46R)
46 (46L)
47 (47R)
47 (47L)
49
5
51
6
62
7
(7L, 7R)
8
9
30 (30R)
30 (30L)
SR31R
SR31L
RSR
RSL
ST1
ST2
M 56
55
PA3
L
R
F
B
OVD
OVB
OVC
OVA
SVb
SVc
SVa
SVd
PA11
PA8
PA8
DR2
70
VP2a
SV2
PA2
SV1
B1
DR1
VP2b
VP1a
VP1b
10
CV1
SP14
SP13
SP11
SP12
PA13
VP4a
SV4
31P1
31L
B1
PA1
PA4
30L
PA14
PA12
VP4b
32L
SR31L
31P2
72L (72)
SP5L
76L
76R
75
SP6L
167j
CL
PA6L
PA5L
PA7L
PLa
PA7R
PRb
71
7L
6a
6
PLb
84
7R
VP5a
SV5
31P3
31R
SP6R
SP5R
PRa
CR
PA5R
PA6R
30R
70
ST70
SR31R
1A
VP5b
32R
31P4
72R (72)

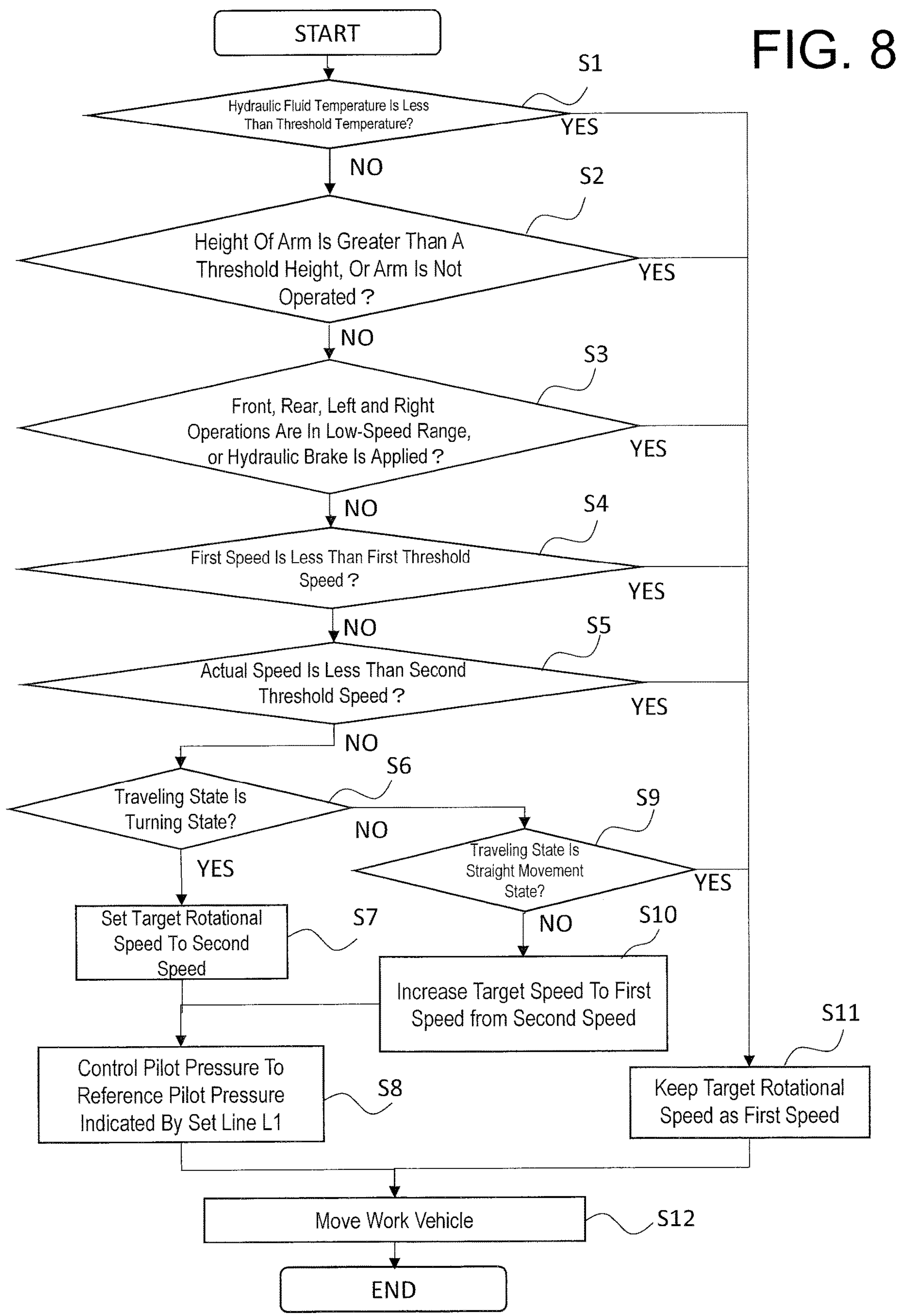
FIG. 8
START
Hydraulic Fluid Temperature Is Less Than Threshold Temperature?
S1
YES
NO
Height Of Arm Is Greater Than A Threshold Height, Or Arm Is Not Operated?
S2
YES
NO
Front, Rear, Left and Right Operations Are In Low-Speed Range, or Hydraulic Brake Is Applied?
S3
YES
NO
First Speed Is Less Than First Threshold Speed?
S4
YES
NO
Actual Speed Is Less Than Second Threshold Speed?
S5
YES
NO
Traveling State Is Turning State?
S6
NO
YES
Traveling State Is Straight Movement State?
S9
YES
NO
Set Target Rotational Speed To Second Speed
S7
Increase Target Speed To First Speed from Second Speed
S10
Control Pilot Pressure To Reference Pilot Pressure Indicated By Set Line L1
S8
Keep Target Rotational Speed as First Speed
S11
Move Work Vehicle
S12
END

WORK VEHICLE AND METHOD FOR CONTROLLING WORK VEHICLE

CROSS-REFERENCE TO RELATED APPLICATIONS

The present application claims priority under 35 U. S. C. § 119 to Japanese Patent Application No. 2021-129066, filed Aug. 5, 2021, and Japanese Patent Application No. 2022-071652, filed Apr. 25, 2022. The contents of these applications are incorporated herein by reference in their entirety.

BACKGROUND OF THE INVENTION

Field of the Invention

The present invention relates to a work vehicle and a method for controlling the work vehicle.

Discussion of the Background

Japanese Unexamined Patent Publication No. 2021-8739 discloses a hydraulic circuit for controlling two hydraulic motors for travel that are arranged on the left and right sides of a work vehicle and two hydraulic pumps for travel that is configured to supply hydraulic fluid to the hydraulic motors. Japanese Patent No. 2714821 discloses, switching speed setting to a low speed setting when the load is increased in order to improve safety when the work vehicle turns. More specifically, Patent Document 2 discloses that the rotational speed of the engine is reduced at the time of low-speed setting.

SUMMARY OF THE INVENTION

According to one aspect of the present disclosure, a method of controlling the work vehicle includes driving a first hydraulic pump and a second hydraulic pump by an engine of a work vehicle to supply hydraulic fluid to a first hydraulic motor and a second hydraulic motor, respectively, to drive a first traveling device and a second traveling device, respectively, to advance the work vehicle, the first traveling device and the second traveling device facing each other, detecting an operation state of a direction input device to operate a traveling direction of the work vehicle, determining whether or not a traveling state of the work vehicle is a turning state based on the operation state that is detected, outputting a rotation command to decrease a target rotational speed of the engine from a first rotational speed to a second rotational speed when it is determined that the traveling state is the turning state, and controlling pilot pressure of the pilot oil supplied to the first hydraulic pump and the second hydraulic pump to be target pilot pressures, displacement volume of the first hydraulic pump and the second hydraulic pump to which target pilot pressures are applied respectively are maximized when substantially no load is applied to the first hydraulic motor and the second hydraulic motor.

According to another aspect of the present disclosure, a work vehicle includes a vehicle body, a first traveling device, a second traveling device, a first hydraulic motor, a second hydraulic motor, a first hydraulic pump, a second hydraulic pump, a pilot pump, an engine, at least one pilot oil passage, a hydraulic pressure adjustment mechanism, a direction input device, a sensor, and a controller. The vehicle body has a first side surface and a second side surface facing the first side surface. The first traveling device is provided on the first side surface of the vehicle body. The second traveling device is provided on the second side surface of the vehicle body. The first hydraulic motor is configured to drive the first traveling device. The second hydraulic motor is configured to drive the second traveling device. The first hydraulic pump is connected to the first hydraulic motor via the first hydraulic circuit and has a first port and a second port. The first hydraulic pump is configured to supply hydraulic fluid to the first hydraulic motor via the first hydraulic circuit to drive the first traveling device forward when the pressure applied to the first port is higher than the pressure applied to the second port. The first hydraulic pump is configured to supply hydraulic fluid to the first hydraulic motor via a first hydraulic circuit to drive the first traveling device backward when the pressure applied to the second port is higher than the pressure applied to the first port. The second hydraulic pump is connected to the second hydraulic motor via a second hydraulic circuit and has a third port and a fourth port. The second hydraulic pump is configured to supply hydraulic fluid to the second hydraulic motor via the second hydraulic circuit to drive the second traveling device forward when pressure applied to the third port is higher than the pressure applied to the fourth port. The second hydraulic pump is configured to supply hydraulic fluid to the second hydraulic motor via the second hydraulic circuit to drive the second traveling device backward when the pressure applied to the fourth port is higher than the pressure applied to the third port. The pilot pump is configured to supply pilot oil to the first hydraulic pump and the second hydraulic pump. The engine is configured to drive the first hydraulic pump, the second hydraulic pump, and the pilot pump. The at least one pilot oil passage connects the pilot pump and the first hydraulic pump and connects the pilot pump and the second hydraulic pump. The hydraulic pressure adjustment mechanism is provided in the at least one pilot oil passage, and is configured to adjust the pilot pressure of each of the at least one pilot oil passage. The direction input device is configured to operate a traveling direction of the work vehicle by instructing forward or backward movement of at least one of the first traveling device and the second traveling device 3R. The sensor is configured to detect operation of the direction input device. The controller is configured to determine whether or not the traveling state of the work vehicle is a turning state based on the operation of the direction input device, to output a rotation command to reduce the target rotational speed of the engine from a first rotational speed to a second rotational speed, and to control the hydraulic pressure adjustment mechanism such that the displacement volume of each of the first hydraulic pump and the second hydraulic pump to which the target pilot pressure is applied is maximized when substantially no load is applied to the first hydraulic motor and the second hydraulic motor.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings.

FIG. 8 is a flowchart showing the operation of the controller of the work vehicle according to the first embodiment.

DESCRIPTION OF THE EMBODIMENTS

Figure 1:
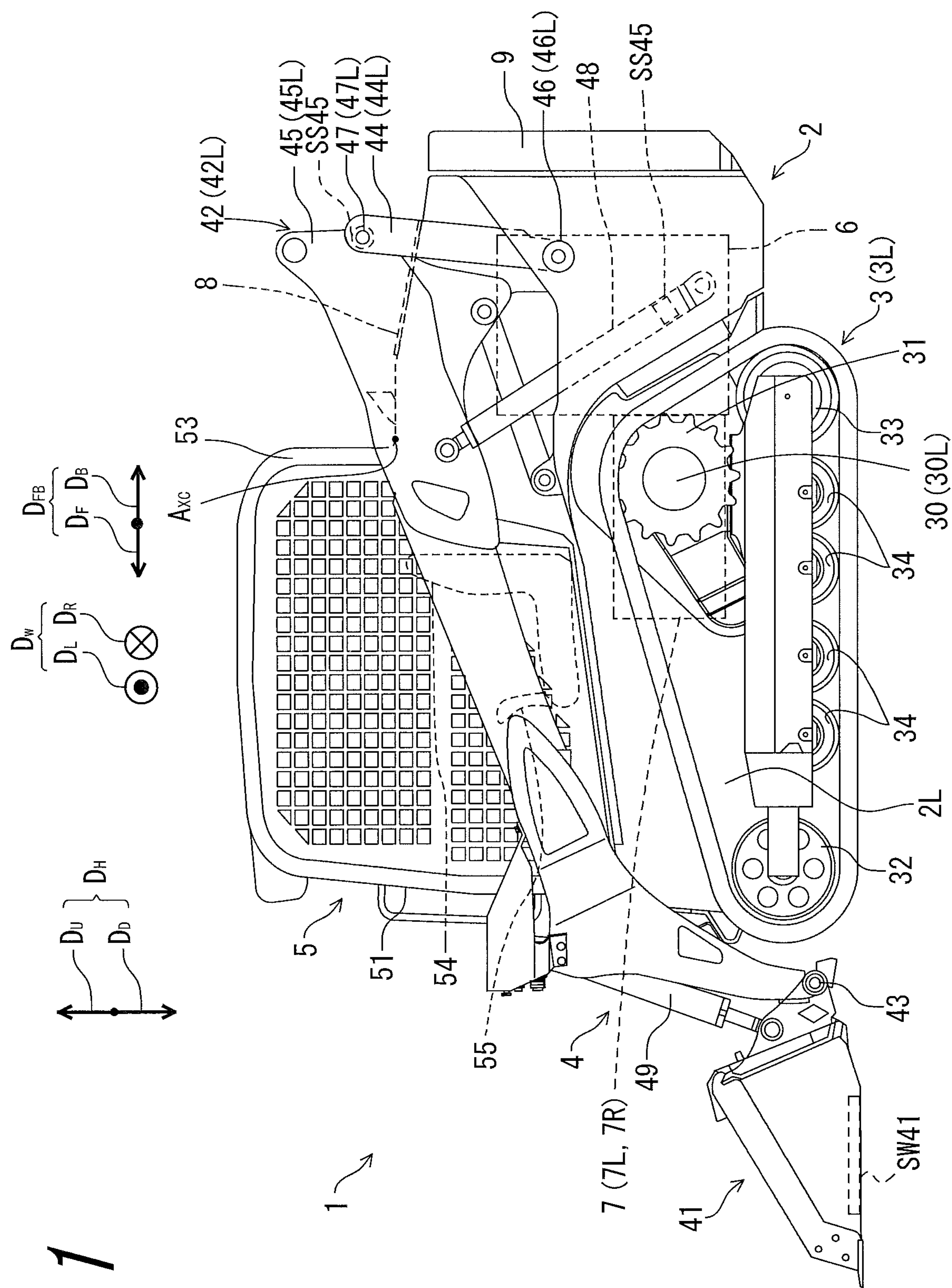
FIG. 1 is a side view of a work vehicle.

Hereinafter, the present invention will be described in detail with reference to drawings showing embodiments thereof. In the drawings, the same reference numerals indicate corresponding or substantially identical configurations.

First Embodiment

<Overall Configuration>

Figure 2:
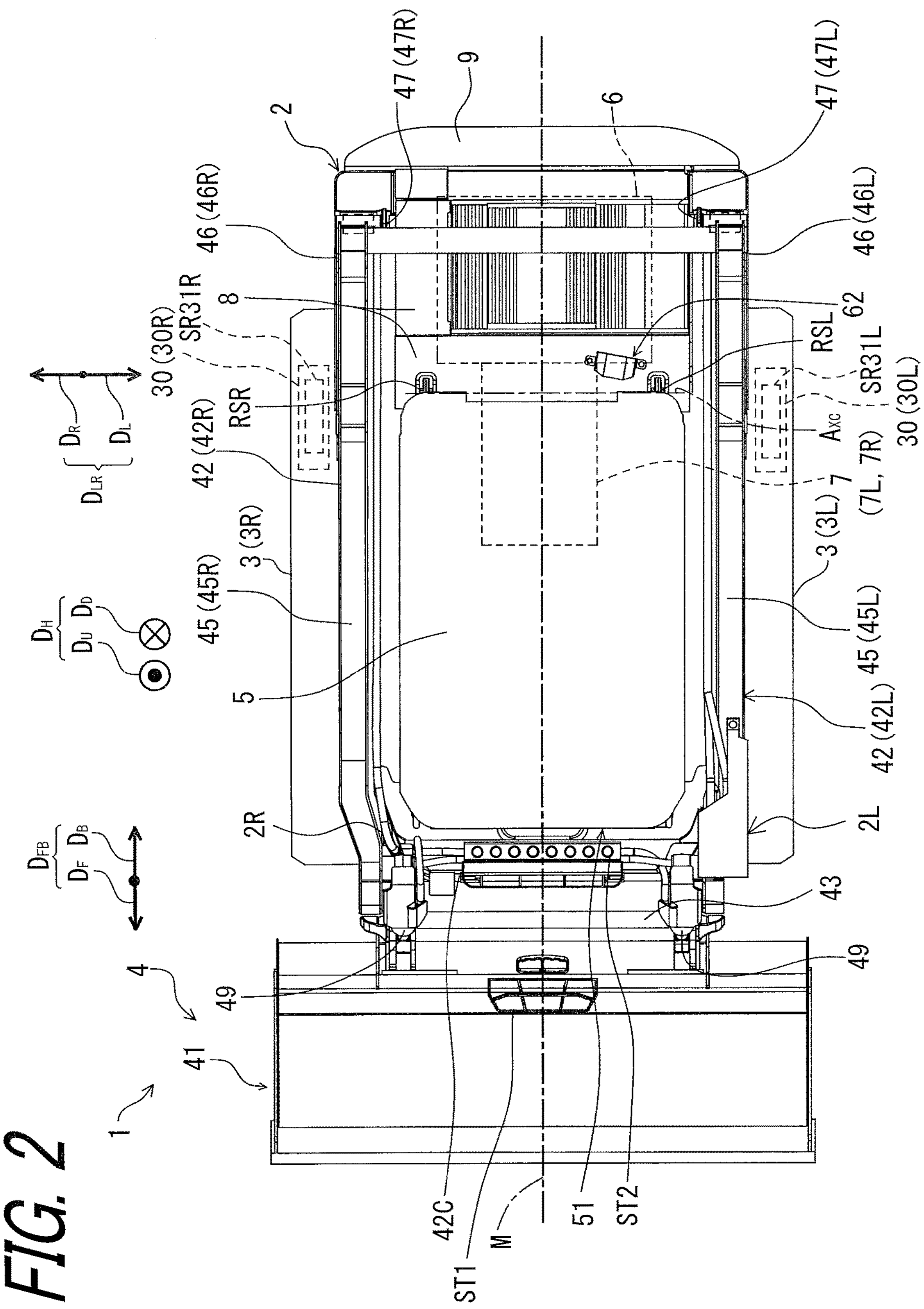
FIG. 2 is a top view of a work vehicle.

Referring to FIGS. 1 and 2, a work vehicle 1, for example, a compact truck loader, includes a vehicle body 2, a pair of traveling devices 3, and a work device 4. The vehicle body 2 supports the traveling devices 3 and the work device 4. In the illustrated embodiment, each of the traveling devices 3 is a crawler type traveling device. Therefore, each of the pair of traveling devices 3 includes a drive wheel 31 driven by the hydraulic motor device 30, driven wheels 32 and 33, and a rolling wheel 34. However, each of the pair of traveling devices 3 is not limited to a crawler type traveling device. Each of the pair of traveling devices 3 may be, for example, a front wheel/rear wheel traveling device or a traveling device having a front wheel and a rear crawler. The work device 4 includes work implement (bucket) 41 at the distal end of work device 4. A proximal end of the work device 4 is attached to a rear portion of the vehicle body 2. The work device 4 includes a pair of arm assemblies 42 for rotatably supporting the bucket 41 via the bucket pivot shaft 43. Each of the pair of arm assemblies 42 includes a link 44 and an arm 45.

The link 44 is rotatable around a fulcrum shaft 46 with respect to the vehicle body 2. The arm 45 is rotatable around a joint shaft 47 with respect to the link 44. The work device 4 further includes a plurality of arm cylinders 48 and at least one work implement cylinder 49. Each of the plurality of arm cylinders 48 is rotatably connected to the vehicle body 2 and the arm 45 and moves the link 44 and the arm 45 or the like to elevate and lower the bucket 41. At least one work implement cylinder 49 is configured to tilt the bucket 41.

The vehicle body 2 includes a cabin 5. The cabin 5 is provided with a front window 51 which can be opened and closed freely, and an outer shape thereof is defined by a cab frame 53. The front window 51 may be omitted. The work vehicle 1 includes a driver's seat 54 and an operation lever 55 in the cabin 5. As shown in FIG. 2, the cab frame 53 is rotatable about rotational shafts RSL and RSR on the vehicle body 2. FIGS. 1 and 2 shows a common pivot $A_{XC}$ defined by the rotational shafts RSL and RSR. That is, the cab frame 53 is attached to the vehicle body 2 so as to be rotatable about the pivot $A_{XC}$.

In the embodiment according to the present the embodiment according to the present application, the front-back direction $D_{FB}$ (forward $D_{F/}$ backward $D_B$) means a forward and backward direction as seen from an operator sitting on the driver's seat 54 of the cabin 5. Left direction $D_L$, right direction $D_R$, width direction $D_W$ mean left direction, right direction, width direction, respectively, as seen from the operator. Up direction $D_U$, down direction $D_D$, height direction $D_H$. means an upward direction, a downward direction and a height direction as viewed from the operator. The front/back, left/right (width), up/down (height) directions of the work vehicle 1 correspond to the front/back, left/right (width), up/down (height) directions as viewed from the operator.

FIG. 1 shows the left side of the work vehicle 1. As shown in FIG. 2, the vehicle body 2 is substantially symmetrical with respect to a center plane M of the vehicle body and has a first side surface 2L which is a left side surface and a second side surface 2R which is a right side surface. Among the pair of traveling devices 3, a traveling device 3 provided on the first side surface 2L is shown as the first traveling device 3L, and a traveling device 3 provided on the second side surface 2R is shown as the second traveling device 3R. Among the pair of arm assemblies 42, an arm assembly 42 provided on the left side with respect to the center plane M of the vehicle body is shown as a first arm assembly 42L, and an arm assembly 42 provided on the right side with respect to the vehicle body center plane M is shown as a second arm assembly 42R. The link 44 provided on the left side with respect to the center plane M of the vehicle body is shown as a first link 44L. The arm 45 provided on the left side with respect to the center plane M the vehicle body is shown as a first arm 45L, and the arm 45 provided on the right side with respect to the center plane M of the vehicle body is shown as a second arm 45R. The fulcrum shaft 46 located on the left side with respect to the center plane M of the vehicle body is shown as a first fulcrum shaft 46L, and the fulcrum shaft 46 provided on the right side with respect to the center plane M of the vehicle body is shown as a second fulcrum shaft 46R. The joint shaft 47 provided on the left side with respect to the center plane M of the vehicle body is shown as a first joint shaft 47L, and the joint shaft 47 provided on the right side with respect to the center plane M of the vehicle body is shown as a second joint shaft 47R. Among the hydraulic motor devices 30, a hydraulic motor device 30 provided on the left side with respect to the center plane M of the vehicle body is shown as a first hydraulic motor device 30L, a hydraulic motor device 30 provided on the right side with respect to the center plane M of the vehicle body is shown as a second hydraulic motor device 30R.

Referring to FIGS. 1 and 2, the work vehicle 1 includes an engine 6 provided at a rear portion of the vehicle body 2, and a plurality of hydraulic pumps 7 including a first hydraulic pump 7L, a second hydraulic pump 7R. The engine 6 drives the plurality of hydraulic pumps 7. The first hydraulic pump 7L and the second hydraulic pump 7R are configured to discharge hydraulic fluid to drive the hydraulic motor devices 30 for driving the drive wheels 31. The plurality of hydraulic pumps 7 other than the first hydraulic pump 7L and the second hydraulic pump 7R are configured to discharge hydraulic fluid to drive hydraulic actuators (a plurality of arm cylinders 48, at least one work implement cylinder 49, and the like) connected to the work device 4. The engine 6 is provided between the pair of arm assemblies 42 in the width direction $D_W$ of the work vehicle 1. The work vehicle 1 is further provided with a cover 8 for covering the engine 6. The work vehicle 1 further includes a bonnet cover 9 provided at the rear end of the vehicle body 2. As the bonnet cover 9 is openable, a maintenance worker can perform maintenance work on the engine 6 and the like.

Figure 3:
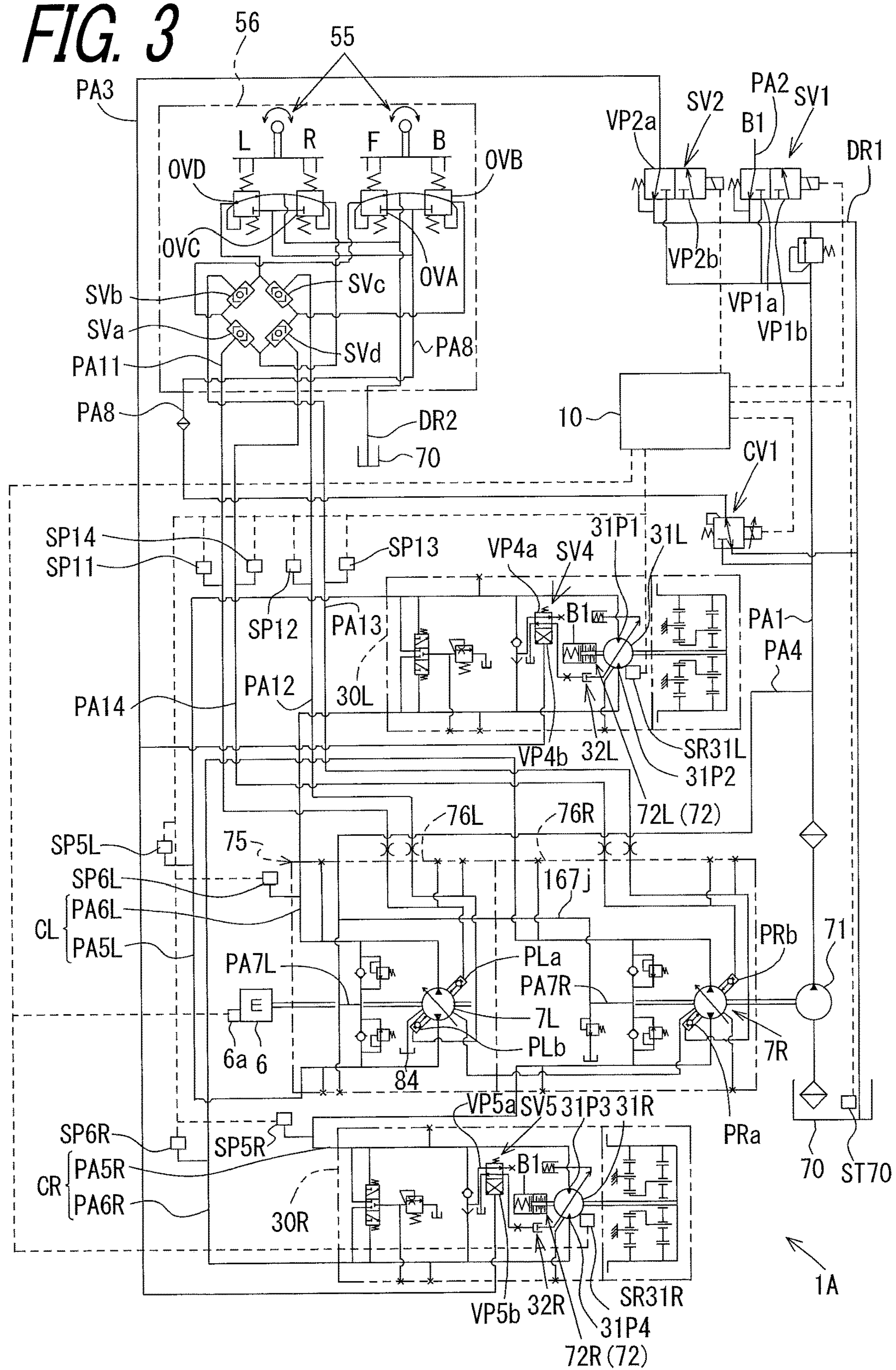
FIG. 3 shows is a hydraulic circuit diagram of a travel system of a work vehicle.

FIG. 3 is a hydraulic circuit diagram of a traveling system of the work vehicle 1. The work vehicle 1 includes a hydraulic circuit 1A. The hydraulic circuit 1A includes a hydraulic fluid tank 70 and a pilot pump 71. The pilot pump 71 is a constant displacement gear pump driven by the power of the engine 6. The pilot pump 71 is configured to discharge the hydraulic fluid stored in the hydraulic fluid tank 70. In particular, the pilot pump 71 is configured to discharge hydraulic fluid mainly used for control. For convenience of explanation, of the hydraulic fluid discharged from the pilot pump 71, the hydraulic fluid used for control is referred to as pilot oil, and the pressure of the pilot oil is referred to as pilot pressure. In particular, the pilot pump 71 is configured to supply the pilot oil to the first hydraulic pump 7L and the second hydraulic pump 7R.

The hydraulic circuit 1A includes a pilot supply oil passage PA1 connected to a discharge port of the pilot pump 71. Pilot oil flows in the pilot supply oil passage PA1. The hydraulic circuit 1A includes a plurality of switching valves (brake switching valves SV1, direction switching valve SV2) connected to the pilot supply oil passage PA1 and a plurality of brake mechanisms 72. The brake switching valve SV1 is connected to the pilot supply oil passage PA1. The brake switching valve SV1 is a direction switching valve (electromagnetic valve) for performing braking and releasing braking by the plurality of brake mechanisms 72. The brake switching valve SV1 is a two-position switching valve configured to switch a valve body of a first position VP1*a* or a second position VP1*b* by excitation. Switching of the valve body of the brake switching valve SV1 is performed by a brake pedal 13 (see FIG. 7). The brake pedal 13 is provided with a sensor 14. An operation amount detected by the sensor 14 is input to a controller 10 including an ECU (Electric Control Unit).

The plurality of brake mechanisms 72 include a first brake mechanism 72L for braking the first traveling device 3L and a second brake mechanism 72R for braking the second traveling device 3R. The first brake mechanism 72L and the second brake mechanism 72R is connected to a brake switching valve SV1 via the oil passage PA2. The first brake mechanism 72L and the second brake mechanism 72R are configured to brake the traveling device 3 in accordance with the pressure of the pilot oil (hydraulic fluid). When the valve body of the brake switching valve SV1 is switched to the first position VP1*a*, the hydraulic fluid is released from the oil passage PA2 in the section between the brake switching valve SV1 and the brake mechanism 72, and the traveling device 3 is braked by the brake mechanism 72. When the valve body of the brake switching valve SV1 is switched to the second position VP1*b*, the braking by the brake mechanism 72 is released. When the valve body of the brake switching valve SV1 is switched to the first position VP1*a*, the braking by the brake mechanism 72 may be released, and when the valve body of the brake switching valve SV1 is switched to the second position VP1*b*, the traveling device 3 may be braked by the brake mechanism 72.

The direction switching valve SV2 is an electromagnetic valve for changing the rotation of the first hydraulic motor device 30L and the second hydraulic motor device 30R. The direction switching valve SV2 is a two-position switching valve configured to switch a valve body to a first position VP2*a* or a second position VP2*b*. Switching of the direction switching valve SV2 is performed by an operation member (not shown) or the like. The direction switching valve SV2 may not be a two-position switching valve but may be a proportional valve capable of adjusting the flow rate of the discharged hydraulic fluid.

The first hydraulic motor device 30L is a device for transmitting power to drive wheels 31 provided in the first traveling device 3L. The first hydraulic motor device 30L includes a first hydraulic motor 31L, a first swash plate switching cylinder 32L, and a first travel control valve (hydraulic switching valve) SV4. The first hydraulic motor 31L is a swash plate type variable capacity axial motor for driving the first traveling device 3L and is capable of changing the vehicle speed (rotation) to either the first speed or the second speed. The first swash plate switching cylinder 32L is configured to change the angle of the swash plate of the first hydraulic motor 31L by expansion and contraction. The first travel control valve SV4 is a valve for expanding and contracting the first swash plate switching cylinder 32L. The first travel control valve SV4 is a two-position switching valve configured to switch its valve body between a first position VP4*a* and a second position VP4*b*.

The switching of the first travel control valve SV4 is performed by a direction switching valve SV2 located on the upstream side connected to the first travel control valve SV4. More specifically, the direction switching valve SV2 and the first travel control valve SV4 are connected by an oil passage PA3, and the switching of the first travel control valve SV4 is performed by the hydraulic fluid flowing through the oil passage PA3. For example, when the valve body of the direction switching valve SV2 is switched to the first position VP2*a* by operation of the operating member, the pilot oil is released in the section between the direction switching valve SV2 and the first travel control valve SV4, so that the valve body of the first travel control valve SV4 is switched to the first position VP4*a*. As a result, the first swash plate switching cylinder 32L contracts, and the speed of the first hydraulic motor 31L is changed to the first speed. Further, when the valve body of the directional switching valve SV2 is switched to the second position VP2*b* by the operation of the operating member, the pilot oil is supplied to the first travel control valve SV4, and the valve body of the first travel control valve SV4 is switched to the second position VP4*b*. As a result, the first swash plate switching cylinder 32L extends, and the speed of the first hydraulic motor 31L is changed to the second speed.

The second hydraulic motor device 30R transmits power to the drive wheels 31 provided in the second traveling device 3R. The second hydraulic motor device 30R includes a second hydraulic motor 31R, a second swash plate switching cylinder 32R, and a second travel control valve (hydraulic switching valve) SV5. The second hydraulic motor device 30R is a hydraulic motor for driving the second traveling device 3R and operates in the same manner as the first hydraulic motor device 30L. That is, the second hydraulic motor 31R operates in the same manner as the first hydraulic motor 31L. The second swash plate switching cylinder 32R operates in the same manner as the first swash plate switching cylinder 32L. The second travel control valve SV5 is a two-position switching valve configured to switch its valve body between a first position VP5*a* and a second position VP5*b* and operates in the same manner as the first travel control valve SV4.

The hydraulic circuit 1A is connected to a drain oil passage DR1. The drain oil passage DR1 is an oil passage which discharges pilot oil into the hydraulic fluid tank 70 from a plurality of switching valves (the brake switching valve SV1, the direction switching valve SV2). For example, the drain oil passage DR1 is connected to discharge ports of the plurality of switching valves (the brake switching valve SV1, the direction switching valve SV2). That is, when the brake switching valve SV1 is at the first position VP1*a*, the hydraulic fluid is discharged from the oil passage PA2 to the drain oil passage DR1 in the section between the brake switching valve SV1 and the brake mechanism 72. When the direction switching valve SV2 is at the first position VP1*a*, the pilot oil in the oil passage PA3 is discharged into the drain oil passage DR1.

The hydraulic circuit 1A includes a first charge oil passage PA4 and a hydraulic drive device 75. The first charge oil passage PA4 branches from the pilot supply oil passage PA1 and is connected to the hydraulic drive device 75. The hydraulic drive device 75 is a device for driving the first hydraulic motor device 30L and the second hydraulic motor device 30R. The hydraulic drive device 75 includes a first drive circuit 76L for driving the first hydraulic motor device 30L and a second drive circuit 76R for driving the second hydraulic motor device 30R.

The first drive circuit 76L includes the first hydraulic pump 7L, drive oil passages PA5L and PA6L, and a second charge oil passage PA7L. The drive oil passages PA5L and PA6L connect the first hydraulic pump 7L and the first hydraulic motor 31L. The hydraulic circuit formed by the drive oil passages PA5L and PA6L is called as a first hydraulic circuit CL. The second charge oil passage PA7L is connected to the drive oil passages PA5L and PA6L to replenish the drive oil passages PA5L and PA6L with the hydraulic fluid from the pilot pump 71. The first hydraulic motor 31L has a first connection port 31P1 connected to the drive oil passage PA5L and a second connection port 31P2 connected to the drive oil passage PA6L. Hydraulic fluid for rotating the first traveling device 3L in the forward direction is inputted to the first hydraulic motor 31L via the first connection port 31P1, and hydraulic fluid for rotating the first traveling device 3L in the backward direction is discharged from the first hydraulic motor 31L via the first connection port 31P1. Hydraulic fluid for rotating the first traveling device 3L in the backward direction is inputted to the first hydraulic motor 31L via the second connection port 31P2, and hydraulic fluid for rotating the first traveling device 3L in the forward direction is discharged from the first hydraulic motor 31L via the second connection port 31P2.

Similarly, the second drive circuit 76R includes the second hydraulic pump 7R, drive oil passages PA5R and PA6R, and a third charge oil passage PA7R. The drive oil passages PA5R and PA6R connect the second hydraulic pump 7R and the second hydraulic motor 31R. The hydraulic circuit formed by the drive oil passages PA5R and PA6R is called as a second hydraulic circuit CR. The third charge oil passage PA7R is connected to the drive oil passages PA5R and PA6R to replenish the drive oil passages PA5R and PA6R with the hydraulic fluid from the pilot pump 71. The second hydraulic motor 31R includes a third connection port 31P3 connected to the drive oil passage PA5R and a fourth connection port 31P4 connected to the drive oil passage PA6R. Hydraulic fluid for rotating the second traveling device 3R in the forward direction is inputted to the second hydraulic motor 31R through the third connection port 31P3, and hydraulic fluid for rotating the second traveling device 3R in the backward direction is discharged from the second hydraulic motor 31R through the third connection port 31P3. Hydraulic fluid for rotating the second traveling device 3R in the backward direction is inputted to the second hydraulic motor 31R through the fourth connection port 31P4, and hydraulic fluid for rotating the second traveling device 3R in the forward direction is discharged from the second hydraulic motor 31R through the fourth connection port 31P4.

The first hydraulic pump 7L and the second hydraulic pump 7R are swash plate type variable displacement axial pumps driven by the power of the engine 6. The first hydraulic pump 7L is connected to the first hydraulic motor 31L via the first hydraulic circuit CL and includes a first port PLa and a second port PLb. In the first hydraulic pump 7L, the angle of the swash place is changed by the pilot pressure acting on the first port PLa and the second port PLb. More specifically, the first hydraulic pump 7L is configured to supply hydraulic fluid to the first hydraulic motor 31L via the first hydraulic circuit CL so as to drive the first traveling device 3L forward when the hydraulic pressure applied to the first port PLa is higher than the hydraulic pressure applied to the second port PLb supply hydraulic fluid, and to supply hydraulic fluid to the first hydraulic motor 31L via the first hydraulic circuit CL so as to drive the first traveling device 3L backward when the hydraulic pressure applied to the second port PLb is higher than the hydraulic pressure applied to the first port PLa.

The second hydraulic pump 7R is connected to the second hydraulic motor 31R through the second hydraulic circuit CR, and has a third port PRa and a fourth port PRb to which the pilot pressure is applied. In the second hydraulic pump 7R, the angle of the swash plate is changed by the pilot pressure acting onto the third port PRa and the fourth port PRb. Specifically, the second hydraulic pump 7R is configured to supply hydraulic fluid to the second hydraulic motor 31R via the second hydraulic circuit CR so as to drive the second traveling device 3R forward when the hydraulic pressure applied to the third port PRa is higher than the hydraulic pressure applied to the fourth port PRb, and to supply hydraulic fluid to the second hydraulic motor 31R via the second hydraulic circuit CR so as to drive the second traveling device 3R backward when the hydraulic pressure applied to the fourth port PRb is higher than the hydraulic pressure applied to the third port PRa. The first hydraulic pump 7L and the second hydraulic pump 7R can change the output (discharge amount of the hydraulic fluid) and the discharge direction of the hydraulic fluid in accordance with the angle of the swash plate.

The output of the first hydraulic pump 7L and the second hydraulic pump 7R and the discharge direction of the hydraulic fluid are changed by an operation device 56 for operating the traveling direction of the work vehicle 1. Hereinafter, the operation device 56 may be referred to as a direction input device. Specifically, the output of the first hydraulic pump 7L and the second hydraulic pump 7R and the discharge direction of the hydraulic fluid are changed in accordance with the operation of the operation lever 55 provided in the operation device 56. In other words, the operation device 56 is configured to select at least one of the first and second traveling devices 3L and 3R, and to operate the traveling direction of the work vehicle 1 by instructing the forward or backward movement of at least one of the traveling devices.

As shown in FIG. 3, the hydraulic circuit 1A is branched from the pilot supply oil passage PA1 and includes a pilot supply oil passage PA8 connected to the operation device 56 and a pilot pressure control valve CV1 provided on the pilot supply oil passage PA8. The pilot pressure control valve CV1 is an electromagnetic proportional valve and is configured to adjust the pilot pressure supplied to the operation device 56 by adjusting the opening degree thereof. The opening degree of the pilot pressure control valve CV1 is controlled by the controller 10. Hereinafter, the pilot pressure control valve CV1 may be referred to as a hydraulic pressure adjustment mechanism. A detailed operation of the pilot pressure control valve CV1 will be described later.

The operation device 56 (the direction input device) includes an operation valve for forward movement OVA, an operation valve OVB for backward movement OVB, an operation valve for right turning OVC, an operation valve for left turning OVD, and the operation lever 55. The operation device 56 has first to fourth shuttle valves SVa, SVb, SVc, and SVd. The operation valves OVA, OVB, OVC, and OVD are operated by a single operation lever 55. The operation valves OVA, OVB, OVC, and OVD change the pressure of the hydraulic fluid in response to the operation of the operation lever 55 and transfer the changed hydraulic fluid to the first port PLa and the second port PLb of the first hydraulic pump 7L, and the third port PRa and the fourth port PRb of the second hydraulic pump 7R. Although the operation valves OVA, OVB, OVC, and OVD are operated by the single operation lever 55 according to the embodiment of the present application, a plurality of operation levers 55 may be used.

The operation valves OVA, OVB, OVC and OVD have an input port (primary port), a discharge port, and an output port (secondary port). As shown in FIG. 3, the input port is connected to the pilot supply oil passage PA8. The discharge port is connected to the drain oil passage DR2 leading to the hydraulic fluid tank 70. The operation lever 55 can be tilted from a neutral position in a front-rear direction, a width direction perpendicular to the front-rear direction, and an oblique direction. The operation valves OVA, OVB, OVC, and OVD of the operation device 56 in response to the tilting of the operation lever 55 are operated. As a result, the pilot pressure corresponding to the manipulated variable from the neutral position of the operation lever 55 is output from the secondary ports of the operation valves OVA, OVB, OVC, and OVD. The relationship between the pilot pressure applied to the primary port outputted from the pilot pressure control valve CV1 and the pilot pressure applied to the secondary port will be described later.

The secondary port of the operation valve OVA and the secondary port of the operation valve OVC are connected to the input port of the first shuttle valve SVa, and the output port of the first shuttle valve SVa is connected to the first port PLa of the first hydraulic pump 7L via a first pilot oil passage PA11. The secondary port of the operation valve OVA and the secondary port of the operation valve OVD are connected to the input port of the second shuttle valve SVb, and the output port of the second shuttle valve SVb is connected to the third port PRa of the second hydraulic pump 7R through a third pilot oil passage PA13. The secondary port of the operation valve OVB and the secondary port of the operation valve OVD are connected to the input port of the third shuttle valve SVc, and the output port of the third shuttle valve SVc is connected to the second port PLb of the first hydraulic pump 7L via a second pilot oil passage PA12. The secondary port of the operation valve OVB and the secondary port of the operation valve OVC are connected to the input port of the fourth shuttle valve SVd, and the output port of the fourth shuttle valve SVd is connected to the fourth port PRb of the second hydraulic pump 7R through a fourth pilot oil passage PA14. In other words, the pilot supply oil passage PA8, the first pilot oil passage PA11, and the fourth pilot oil passage PA14 connect the pilot pump 71 and the first hydraulic pump 7L. The pilot supply oil passage PA8, the second pilot oil passage PA12, and the third pilot oil passage PA13 connect the pilot pump 71 and the second hydraulic pump 7R.

When the operation lever 55 is tilted forward, the operation valve OVA for forward movement is operated, and the pilot pressure is output from the operation valve OVA. This pilot pressure is applied to the first port PLa from the first shuttle valve SVa through the first pilot oil passage PA11 connecting the operation device 56 to the first port PLa of the first hydraulic pump 7L, and also is applied to the third port PRa from the second shuttle valve SVb through the third pilot oil passage PA13 connecting the operation device 56 to the third port PRa of the second hydraulic pump 7R. As a result, the output shaft of the first hydraulic pump 7L and the output shaft of the second hydraulic pump 7R rotate in the forward direction at a speed corresponding to the tilt amount of the operation lever 55, and the work vehicle 1 moves straight forward.

Also when the operation lever 55 is tilted backward, the operation valve OVB for backward movement is operated so that pilot pressure is output from the operation valve OVB. This pilot pressure is applied to the second port PLb of the first hydraulic pump 7L from the third shuttle valve SVc through the second pilot oil passage PA12 connecting the operation device 56 and the second port, and also is applied to the fourth port PRb from the fourth shuttle valve SVd through the fourth pilot oil passage PA14 connecting the operation device 56 and the fourth port PRb of the second hydraulic pump 7R. As a result, the output shaft of the first hydraulic pump 7L and the output shaft of the second hydraulic pump 7R are reversely rotated (backward rotation) at a speed corresponding to the tilt amount of the operation lever 55, and the work vehicle 1 moves straight rearward.

When the operation lever 55 is tilted rightward, the operation valve OVC for right turning is operated such that the pilot pressure is output from the operation valve OVC. This pilot pressure is applied to the first port PLa of the first hydraulic pump 7L from the first shuttle valve SVa through the first pilot oil passage PA11 and also is applied to the fourth port PRb of the second hydraulic pump 7R from the fourth shuttle valve SVd through the fourth pilot oil passage PA14. As a result, it turns to the right in a manner corresponding to the operating position in the right direction of the operation lever 55.

Also when the operation lever 55 is tilted leftward, the operation valve OVD for left turning is operated such that the pilot pressure is output from the operation valve OVD. This pilot pressure is applied to the third port PRa of the second hydraulic pump 7R from the second shuttle valve SVb through the third pilot oil passage PA13, and also is applied to the second port PLb of the first hydraulic pump 7L from the third shuttle valve SVc through the second pilot oil passage PA12. As a result, it turns to the left in a manner corresponding to the operating position in the left direction of the operation lever 55.

That is, when the operation lever 55 is tilted leftward and forward, the work vehicle 1 moves forward at a speed corresponding to the operating position of the operation lever 55 in the front-rear direction, and turns to the left in a manner corresponding to the operating position of the operation lever 55 in the left direction. When the operation lever 55 is tilted rightward and forward, the work vehicle 1 rotates to the right while advancing at a speed corresponding to the operating position of the operation lever 55. When the operation lever 55 is tilted leftward and rearward, the work vehicle 1 turns to the left while moving backward at a speed corresponding to the operating position of the operation lever 55. When the operation lever 55 is tilted rightward and rearward, the work vehicle 1 turns to the right while moving backward at a speed corresponding to the operating position of the operation lever 55.

Next, a detailed operation of the pilot pressure control valve CV1 will be described. The work vehicle 1 includes a setting member 11 (see FIG. 7) for setting a target rotational speed of the engine 6. The setting member 11 is an accelerator pedal which is a speed input device different from the above-described direction input device or an accelerator lever which is swingably supported. The setting member 11 is provided with a sensor 12. The operation amount detected by the sensor 12 is input to the controller 10. The engine rotational speed corresponding to the operation amount detected by the sensor 12 is the target rotational speed of the engine 6. In other words, the target rotational speed of the engine 6 is set based on the operation amount of the setting member 11. The controller 10 outputs a rotation command indicating, for example, a fuel injection quantity, an injection timing, and a fuel injection rate to the injector so as to reach the target rotational speed of the engine 6 that has been determined. Alternatively, the controller 10 outputs a rotation command indicating the fuel injection pressure or the like to the supply pump or the common rail so as to reach the target rotational speed of the engine 6 that has been determined. A sensor 6*a* to detect an actual engine rotational speed (referred to as an actual rotational speed of the engine 6) is connected to the controller 10, and the actual rotational speed of the engine 6 is inputted to the controller 10. The sensor 6*a* is, for example, a potentiometer configured to detect a rotational speed of a rotating member connected to the crankshaft of the engine 6. When a load is applied to the engine 6, the actual rotational speed of the engine 6 decreases from the target rotational speed of the engine 6. The amount of decrease in the actual rotational speed from the target rotational speed (the difference between the target rotational speed of the engine and the actual rotational speed of the engine) when a load is applied to the engine 6 is referred to as a drop amount of the engine.

Figure 4:
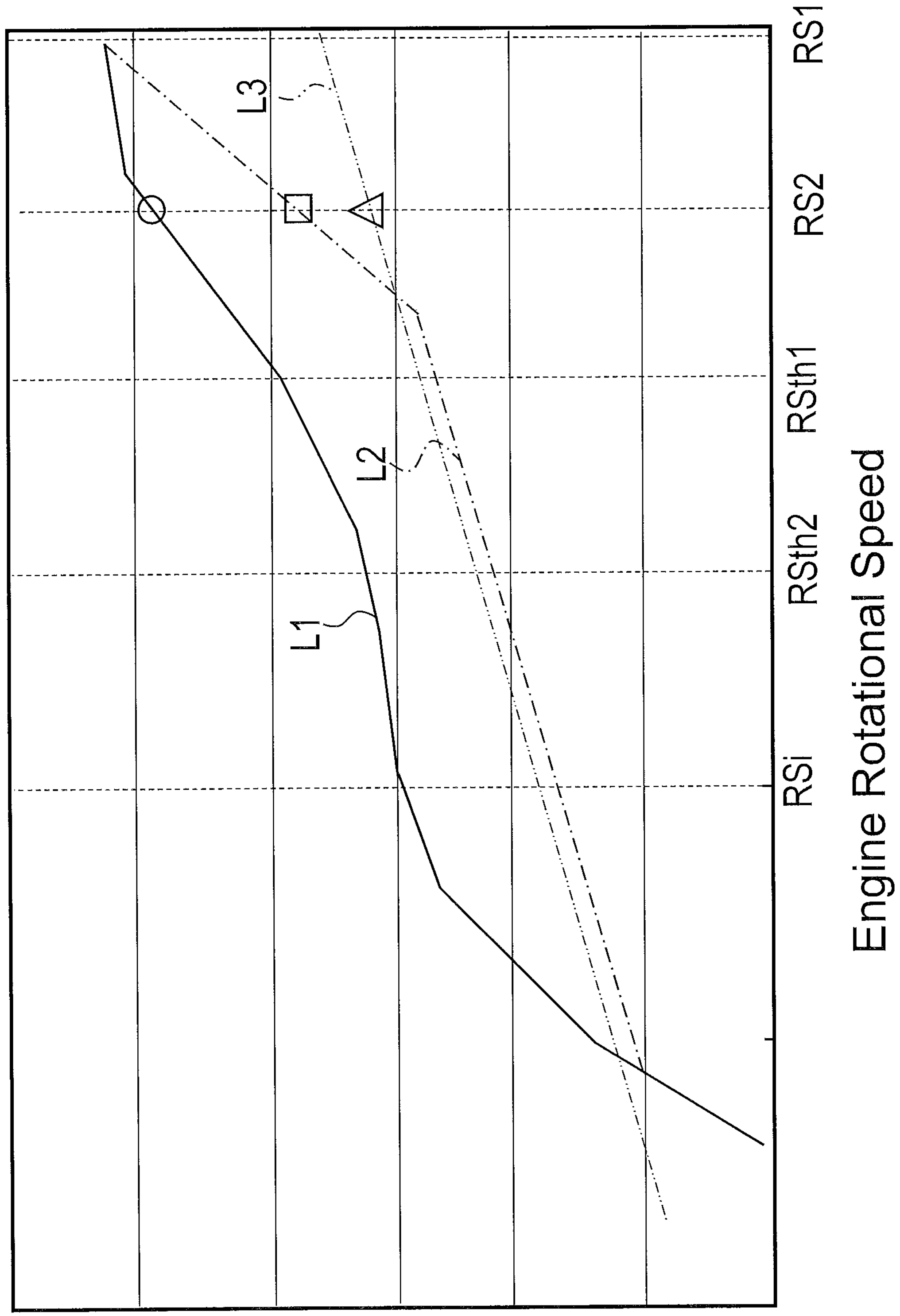
FIG. 4 is a diagram showing a relationship between an engine rotational speed, a traveling primary pressure, and a set line.

The pilot pressure control valve CV1 can set a pilot pressure (a primary pilot pressure) that is applied to the input ports (primary ports) of the plurality of operation valves OVA, OVB, OVC, and OVD based on a drop amount Δ E1 of the rotational speed (the engine rotational speed E1) of the engine 6. The rotational speed of the engine 6 can be detected by the detection sensor 6*a* of the engine rotational speed E1. The engine rotational speed E1 detected by the detection sensor 6*a* is input to the controller 10. FIG. 4 shows the relationship between the engine rotational speed, a traveling primary pressure (the primary pilot pressure), and the set lines L1 and L2. The set line L1 shows the relationship between the engine rotational speed E1 and the traveling primary pressure when the reduction amount Δ E1 is less than a predetermined value (less than an anti-stall determination value). The set line L2 indicates the relationship between the engine rotational speed E1 and the traveling primary pressure when the reduction amount Δ E1 is equal to or greater than the anti-stall determination value. When the difference between the first rotational speed RS1 determined based on the operation amount of the setting member 11 and the actual rotational speed of the engine 6 is smaller than a predetermined stall determination speed difference (the anti-stall determination value), the primary pilot pressure corresponding to the first rotational speed RS1 transitions in accordance with the first correspondence indicated by the set line L1. When the difference between the first rotational speed RS1 and the actual rotational speed of the engine 6 is equal to or greater than the predetermined stall determination speed difference (the anti-stall determination value), the primary pilot pressure corresponding to the first rotational speed RS1 transitions in accordance with the second correspondence indicated by the set line L2.

When the reduction amount Δ E1 is less than the anti-stall determination value, the controller 10 adjusts the opening degree of the pilot pressure control valve CV1 so that the relationship between the engine rotational speed E1 and the traveling primary pressure matches the reference pilot pressure indicated by the set line L1. When the reduction amount Δ E1 is equal to or greater than the anti-stall determination value, the controller 10 adjusts the opening degree of the pilot pressure control valve CV1 so that the relationship between the engine rotational speed E1 and the traveling primary pressure coincides with a set line L2 lower than the reference pilot pressure. The traveling primary pressure with respect to the predetermined engine rotational speed E1 at the set line L2 is lower than the traveling primary pressure with respect to the predetermined engine rotational speed E1 at the set line L1. That is, when attention is paid to the same engine rotational speed E1, the traveling primary pressure of the set line L2 is set lower than the traveling primary pressure of the set line L1. Therefore, the pressure (pilot pressure) of the hydraulic fluid entering the operation valves OVA, OVB, OVC, and OVD is suppressed low. As a result, the swash plate angles of the first hydraulic pump 7L and the second hydraulic pump 7R are adjusted, the load acting on the engine 6 is reduced, and stalling of the engine 6 can be prevented. Although a single set line L2 is shown in FIG. 4, a plurality of set lines L2 may be used. For example, the set line L2 may be set for each engine rotational speed E1. Further, it is preferable that the controller 10 has data indicating the set lines L1 and L2, or control parameters such as functions.

Figure 5:
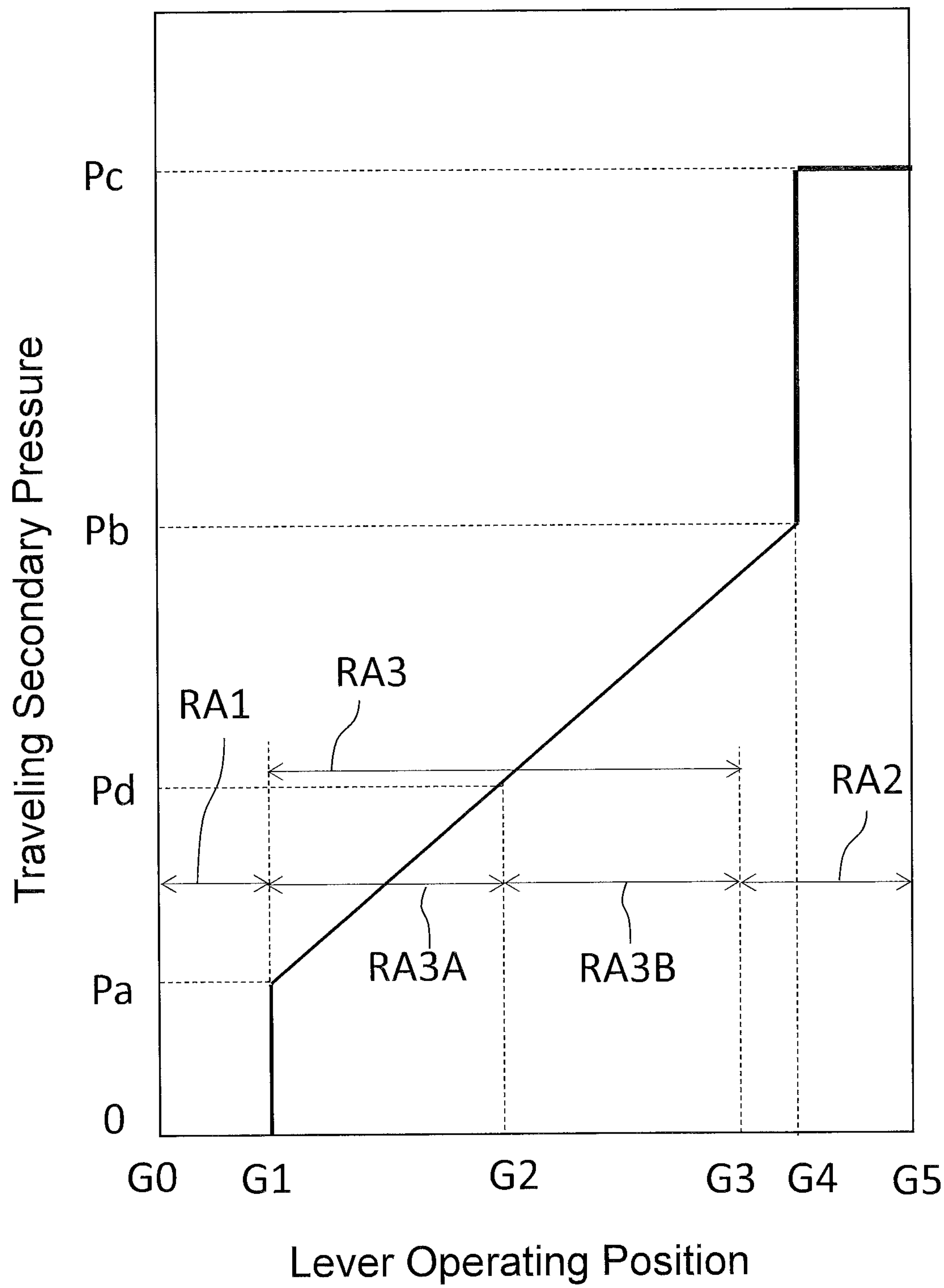
FIG. 5 is a diagram showing the relationship between the operating position of the operation lever and the traveling secondary pressure.

Next, a secondary pilot pressure output from the secondary port of operation valves OVA, OVB, OVC, OVD will be described. FIG. 5 is a diagram showing the relationship between the operating position of the operation lever and the traveling secondary pressure (the secondary pilot pressure). Referring to FIG. 4, the origin of the lever operating position is the operation start position (the neutral position, G0 position) which is a stall position of the lever stroke, and as the lever operating position separates from the origin, the lever operating position approaches the operation end position (G5 position) which is the end position of the lever stroke. The operation region of the operation lever 55 is divided into a neutral range RA1 in which the operation target does not operate (from the position G0 to the position G1 in the illustrated example), an almost full operation range RA2 near the operation end (from the position G3 to the position G5 in the illustrated example), and an intermediate range RA3 between the neutral range RA1 and the almost frill operation range RA2 (from the position G1 to the position G3 in the illustrated example). Further, the intermediate range RA3 is divided into a low speed range RA3A from the G1 position to the G2 position and an intermediate speed range RA3B from the G2 position to the G3 position.

In neutral range RA1, the secondary pilot pressure is not supplied even when the operation lever 55 is operated. On the other hand, in the almost full operation range RA2, the speed of the operation target is not adjusted, so that the operation lever 55 is operated to the operation end position (G5 position) without stopping in the middle. In the intermediate range RA3, the operation lever 55 is stopped at an arbitrary position within the region or the position thereof is changed so that the speed of the operation target is adjusted to a desired speed of the operator. For example, the ratios of the respective ranges RA1, RA3A, RA3B, and RA2 to the lever stroke are as follows.

Neutral range RA1: 0% or more and less than 15%

Law speed range RA3A: 15% or more and less than 45%

Intermediate speed range RA3B: 45% or more and less than 75%

Almost full operation range RA2: 75% to 100%.

In the characteristic diagram shown in FIG. 5, when the operation lever 55 is operated from the G0 position to the G1 position, a secondary pilot pressure (Pa) is generated, and when the operation lever 55 is operated from the G1 position to the G4 position, the secondary pilot pressure rises from Pa to Pb in proportion to the amount of operation of the operation lever 55. Further, at the position G4, the primary pilot pressure is short-cut and flows to the secondary side, so that the secondary pilot pressure rises from Pb to the maximum output pressure Pc at once. While the operation lever 55 is operated from the G4 position to the G5 position, the secondary pilot pressure is constant at the maximum output pressure Pc and is equal to the primary pilot pressure. That is, when the displacement from the neutral position of the operation lever 55 (the direction input device) for instructing the leftward movement is equal to or greater than a first displacement value (a displacement from G0 to G4), the operation device 56 outputs the primary pilot pressure to be input to the operation device 56 to the first port PLa and the fourth port PRb. The operation device 56 outputs the primary pilot pressure to be inputted to the operation device 56 to the second port PLb and the third port PRa when the displacement from a neutral position of the operation lever 55 (the direction input device) for instructing movement in the right direction is not less than the first displacement value (the displacement from G0 to G4). When the displacement from the neutral position of the operation lever 55 (the direction input device) for instructing movement in the forward direction is not less than the first displacement value (the displacement from G0 to G4), an operation device 56 outputs the primary pilot pressure to be inputted to the operation device 56 to the first port PLa and the third port PRa. When the displacement from the neutral position of the operation lever 55 (direction input device) for instructing movement in the rearward direction is not less than the first displacement value (displacement from G0 to G4), an operation device 56 outputs the primary pilot pressure inputted to the operation device 56 to the second port PLb and the fourth port PRb. The characteristic value of the secondary pilot pressure in the front-rear direction may be different from the characteristic value of the secondary pilot pressure in the left-right direction. Assuming that the characteristic values of the secondary pilot pressure in the front-rear direction corresponding to G0 to G5 and Pa to Pc are G0' to G5' and Pa' to Pc', the operation device 56 may output the primary pilot pressure input to the operation device 56 to the first port PLa and the third port PRa when the displacement of the operation lever 55 (the direction input device) for instructing the movement in the forward direction from the neutral position is not less than a second displacement value (a displacement from G0' to G4'). The operation device 56 may output the primary pilot pressure input to the operation device 56 to the second port PLb and the fourth port PRb when the displacement from the neutral position of the operation lever 55 (the direction input device) for instructing the movement in the rearward direction is not less than the second displacement value (the displacement from G0' to G4'). Further, Pa and Pb (Pa' and Pb') are values independent of the magnitude of the primary pilot pressure, but when the primary pilot pressure is lower than Pa or Pb (Pa' or Pb'), the secondary pilot pressure reaches a plateau at the magnitude of the primary pilot pressure.

Based on the features of the operation valves OVA, OVB, OVC, and OVD described above, the movement of the work vehicle 1 corresponding to the operation of the operation lever 55 will be described in more detail. When the operation amount of the operation lever 55 in the front-rear direction is larger than the operation amount of the operation lever 55 in the right-hand direction and the operation lever 55 is operated such that the operating position in the right direction is between the G1 position and the G3 position, the work vehicle 1 turns clockwise with a large radius of curvature by rotating the first hydraulic pump 7L and the second hydraulic pump 7R in the same direction in a state where the rotational speed of the first hydraulic pump 7L is greater than the rotational speed of the second hydraulic pump 7R. When the operating position of the operation lever 55 in the right direction becomes the same position as the operating position in the front-rear direction, the rotational speed of the second hydraulic pump 7R becomes 0, and only the first hydraulic pump 7L rotates, so that the work vehicle 1 makes a right pivot turn (right pivot turn). In addition, when the operation lever 55 is operated such that the operating position in the right direction is between the G4 position and the G5 position, as a result, the operating position in the right direction becomes larger than the operating position in the front-rear direction, the output shaft of the first hydraulic pump 7L rotates in the forward direction and the output shaft of the second hydraulic pump 7R rotates in the reverse direction so that the work vehicle 1 turns to the right.

Also, when the operation amount of the operation lever 55 in the front-rear direction is larger than the operation amount in the left direction, and the operation lever 55 is operated such that the operating position in the left direction is between the G1 position and the G3 position, the work vehicle 1 turns counterclockwise in a large radius of curvature by rotating the second hydraulic pump 7R and the first hydraulic pump 7L in the same direction in a state where the rotational speed of the second hydraulic pump 7R is larger than the rotational speed of the first hydraulic pump 7L. When the operating position of the operation lever 55 in the left direction becomes the same position as the operating position in the front-rear direction, the rotational speed of the first hydraulic pump 7L becomes 0, and only the second hydraulic pump 7R rotates, so that the work vehicle 1 makes a left pivot turn (left pivot turn). Furthermore, when the operation lever 55 is operated such that the operating position in the left direction is between the G4 position and the G5 position, the operating position becomes larger than the operating position in the front-rear direction, the output shaft of the second hydraulic pump 7R rotates in the forward direction and the output shaft of the first hydraulic pump 7L rotates in the reverse direction, and the work vehicle 1 turns to the left. According to the embodiment of the present application, turning means a movement of the work vehicle 1 when the operation lever 55 is operated such that the operating position in the right direction is between the G4 position and the G5 position or when the operation lever 55 is operated such that the operating position in the left direction is between the G4 position and the G5 position.

On the other hand, when the operation lever 55 is operated such that the operating position in the forward direction is between the G4 position and the G5 position, the operating position in the forward direction becomes larger than the operating position in the left and right direction, and the output shafts of the first hydraulic pump 7L and the second hydraulic pump 7R are rotated in the forward direction so that the work vehicle 1 moves forward at high speed. When the operation lever 55 is operated such that the operating position in the rearward direction is between the G4 position and the G5 position, the operating position in the rearward direction becomes larger than the operating position in the left-right direction, the output shafts of the first hydraulic pump 7L and the second hydraulic pump 7R are reversely rotated so that the work vehicle 1 moves backward at a high speed. Other operations of the operation lever 55 in the front-rear direction are the same as those in the left-right direction.

Figure 6:
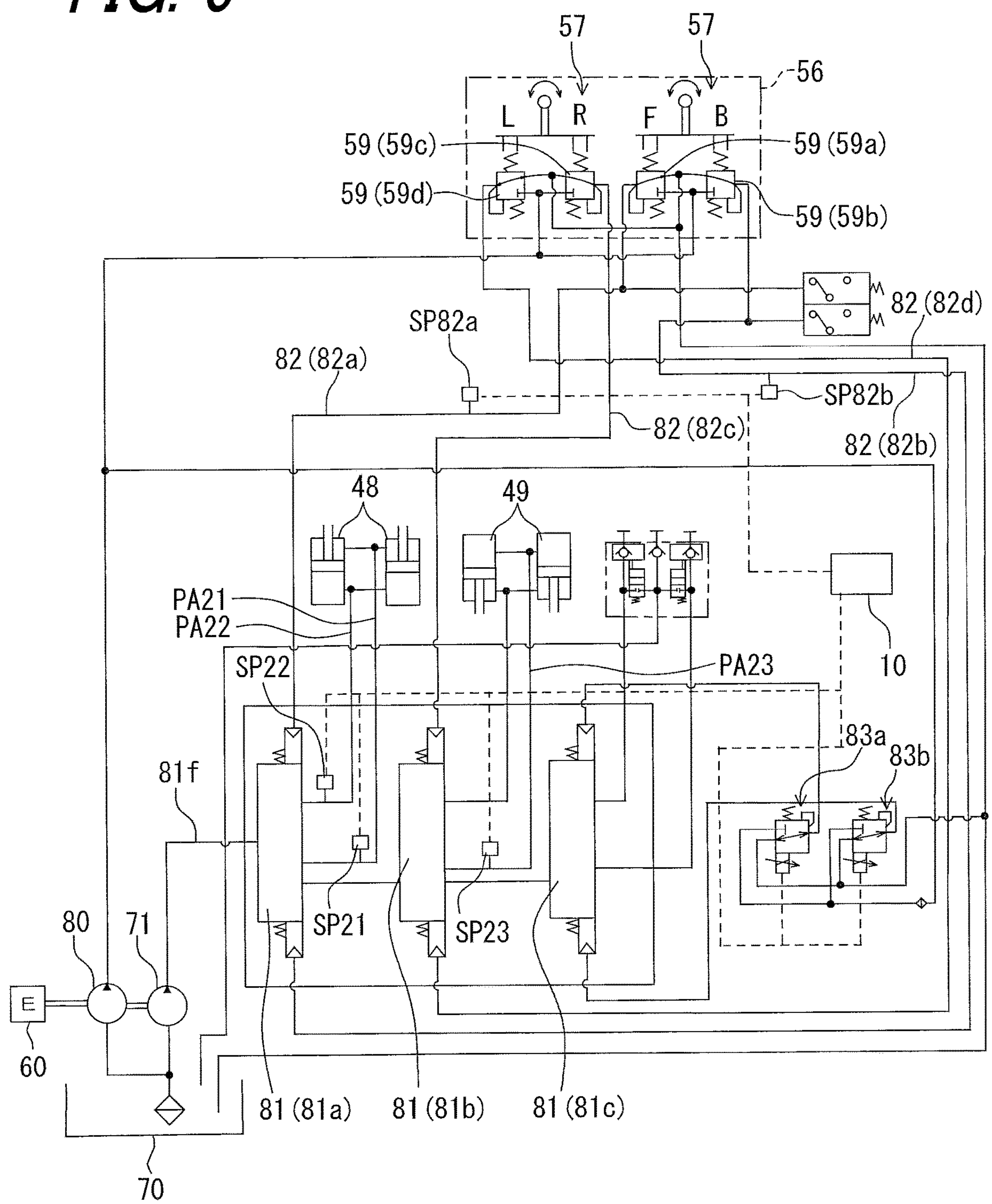
FIG. 6 is a hydraulic circuit diagram of a work system of the work vehicle.

FIG. 6 is a hydraulic circuit diagram of a work system of the work vehicle 1. As shown in FIG. 6, the hydraulic system of the work system is a system for operating the work device 4 and the like. The hydraulic system of the work system is a system in which hydraulic pumps other than the hydraulic pumps 7L and 7R of the traveling system are driven by the engine 6 to operate the work device 4. A hydraulic system of a work system includes a plurality of control valves 81 and a main pump 80 which is a hydraulic pump to discharge hydraulic fluid. The main pump 80 is a pump arranged at a position different from that of the pilot pump 71 which is above described, and is constituted by a low-capacity gear pump. The main pump 80 is configured to discharge the hydraulic fluid stored in the hydraulic fluid tank 70. In particular, the main pump 80 is configured to mainly discharge hydraulic fluid for operating the hydraulic actuator.

An oil passage 81*f* is provided on the discharge side of the pilot pump 71. A plurality of control valves 81 are connected to the oil passage 81*f*. The plurality of control valves 81 include an arm control valve 81*a*, a bucket control valve 81*b*, and a spare control valve 81*c*. The arm control valve 81*a* includes a valve to control the arm cylinders 48, the bucket control valve 81*b* is a valve to control the work implement cylinder 49, and the spare control valve 81*c* is a valve to control a hydraulic actuator of a spare attachment.

The arm 45 and the work implement (bucket) 41 can be operated by a work operation lever 57 of the operation device 56. The work operation lever 57 may be referred to as an arm operation device. The work operation lever 57 is supported by a plurality of operation valves 59 to swing in the left-right direction (width direction) or the front-back direction. By tilting the work operation lever 57, the operation valve 59 provided at the lower portion of the work operation lever 57 can be operated.

The operation valves 59 and the control valves 81 are connected by a plurality of hydraulic fluid passages 82 (82*a*, 82*b*, 82*c*, 82*d*), respectively. Specifically, the operation valve 59*a* is connected to the arm control valve 81*a* via a hydraulic fluid passage 82*a*. The operation valve 59*b* is connected to the arm control valve 81*a* via a hydraulic fluid passage 82*b*. The operation valve 59*c* is connected to the bucket control valve 81*b* via the hydraulic fluid passage 82*c*. The operation valve 59*d* is connected to the bucket control valve 81*b* via the hydraulic fluid passage 82*d*. Each of the plurality of operation valves 59*a* to 59*d* is capable of setting the pressure of the hydraulic fluid to be output in response to the operation of the operation lever 57.

When the work operation lever 57 is tilted forward, the operation valve 59*a* is operated such that the pilot pressure is output from the operation valve 59*a*. This pilot pressure is applied to a pressure-receiving portion of the arm control valve 81*a* to supply the hydraulic fluid in the arm control valve 81*a* via an oil passage PA21 to a rod side of the arm cylinder 48, thereby the arm 5 goes down. When the work operation lever 57 is tilted backward, the operation valve 59*b* is operated and the pilot pressure is output from the operation valve 59*b*. This pilot pressure is applied to the pressure-receiving portion of the arm control valve 81*a* to supply the hydraulic fluid in the arm control valve 81*a* to a bottom side of the arm cylinder 48 via an oil passage PA22, so that the arm 45 rises.

That is, the arm control valve 81*a* can control a flow rate of the hydraulic fluid flowing through the arm cylinder 48 according to the pressure of the hydraulic fluid set by the operation by the work operation lever 57 (the pilot pressure set by the operation valve 59*a*, the pilot pressure set by the operation valve 59*b*). When the work operation lever 57 is tilted rightward, the operation valve 59*c* is operated, and the pilot pressure is applied to a pressure receiving portion of the bucket control valve 81*b*. As a result, the bucket control valve 81*b* operates in a direction in which the work implement cylinder 49 is extended, and the work implement (bucket) 41 performs dumping at a speed proportional to the tilt amount of the work operation lever 57.

When the work operation lever 57 is tilted leftward, the operation valve 59*d* is operated, and the pilot oil is applied to the pressure receiving portion of the bucket control valve 81*b*. As a result, the bucket control valve 81*b* operates in a direction in which the work implement cylinder 49 is contracted by supplying hydraulic fluid to the rod side of the work implement cylinder 49 via an oil passage PA23, so that the work implement (bucket) 41 performs scooping at a speed proportional to the tilt amount of the work operation lever 57. That is, the bucket control valve 81*b* is capable of controlling the flow rate of the hydraulic fluid flowing to the work implement cylinder 49 according to the pressure of the hydraulic fluid set by the operation of the work operation lever 57 (the pilot pressure set by the operation valve 59*c*, the pilot pressure set by the operation valve 59*d*). That is, the operation valves 59*a*, 59*b*, 59*c*, and 59*d* change the pressure of the hydraulic fluid in accordance with the operation of the work operation lever 57, and supply the changed hydraulic fluid to control valves such as the arm control valve 81*a*, the bucket control valve 81*b*, and the spare control valve 81*c*.

Figure 7:
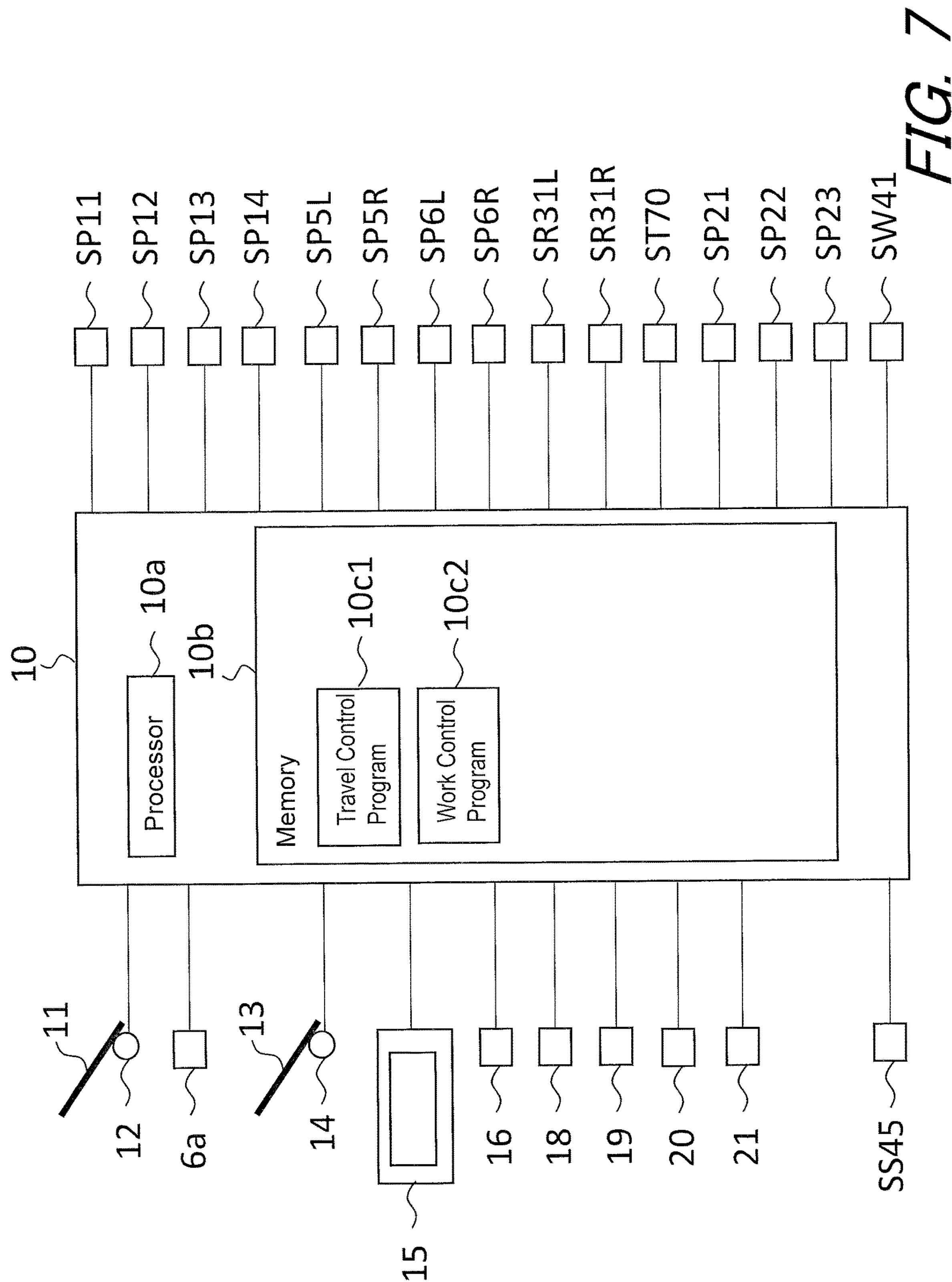
FIG. 7 is a block diagram of a work vehicle.

The work vehicle 1 is provided with various switches and sensors connected to the controller 10 described above. FIG. 7 is a block diagram of the work vehicle 1. Referring to FIG. 7, the work vehicle 1 includes an operation panel 15 and a switch 16 via which the operation of the spare attachment described above is input. The operation panel 15 is, for example, a touch panel capable of displaying various states of the work vehicle 1 and performing various settings according to the embodiment of the present application. The display and operation of the operation panel 15 will be described later. The switch 16 is provided around the driver's seat 54. The switch 16 is formed of, for example, a swingable seesaw switch, a slidable slide switch, or a pushable push switch. The operation of the switch 16 is input to the controller 10. The first electromagnetic valve 83*a* and the second electromagnetic valve 83*b*, by the electromagnetic valve or the like shown in FIG. 6 open in accordance with the operation amount of the switch 16. As a result, pilot oil is supplied to the spare control valve 81*c* connected to the first electromagnetic valve 83*a* and the second electromagnetic valve 83*b*, and the spare actuator of the spare attachment is operated by the hydraulic fluid supplied from the spare control valve 81*c*.

Referring to FIGS. 3 and 7, the work vehicle 1 includes a hydraulic pressure sensor SP11 to detect a hydraulic pressure of the first pilot oil passage PA11, a hydraulic pressure sensor SP12 to detect a hydraulic pressure of the second pilot oil passage PA12, a hydraulic pressure sensor SP13 to detecting a hydraulic pressure of the third pilot oil passage PA13, and a hydraulic pressure sensor SP14 to detecting a hydraulic pressure of the fourth pilot oil passage PA14. As described above, the secondary pilot pressures output from the secondary ports of the operation valves OVA, OVB, OVC, and OVD vary in accordance with the operating position of the operation lever 55. Accordingly, the hydraulic sensors SP11 to SP14 are sensors to detect the operation of the operation device 56 (the direction input device).

The work vehicle 1 includes a hydraulic pressure sensor SP5L to detect a hydraulic pressure of the drive oil passage PA5L, a hydraulic pressure sensor SP6L to detect a hydraulic pressure of the drive oil passage PA6L, a hydraulic pressure sensor SP5R to detect a hydraulic pressure of the drive oil passage PA5R, and a hydraulic pressure sensor SP6R to detect a hydraulic pressure of the drive oil passage PA6R. The states of the first hydraulic motor 31L and the second hydraulic motor 31R can be detected from a pressure difference between the hydraulic sensor SP5L and the hydraulic sensor SP6L and a pressure difference between the hydraulic sensor SP5R and the hydraulic sensor SP6R. Therefore, the hydraulic sensors SP5L to SP6R can be regarded as sensors to detect the operation of the operation device 56 (the direction input device).

Referring to FIGS. 2, 3, and 7, the work vehicle 1 may further include a rotation sensor SR31L to detecting a rotational speed of the first hydraulic motor 31L and a rotation sensor SR31R to detecting a rotational speed of the second hydraulic motor 31R. The state of the first hydraulic motor 31L and the second hydraulic motor 31R can be detected from the rotational direction and a magnitude of the rotational speed detected by the rotational sensor SR31L and the rotational direction and a magnitude of the rotational speed detected by the rotational sensor SR31R. Therefore, the rotation sensors SR31L and SR31R can be regarded as sensors to detect the operation of the operation device 56 (the direction input device).

The work vehicle 1 may include an operation detection sensor 18 to detect the operating position of the operation lever 55. The operation detection sensor 18 is connected to the controller 10, which is described later. The operation detection sensor 18 is a position sensor to detect the position of the operation lever 55. Therefore, the operation detection sensor 18 is a sensor to detect the operation of the operation device 56 (the direction input device). Similarly, the work vehicle 1 may include a work operation detection sensor 19 to detect the operating position of the work operation lever 57. The work operation detection sensor 19 is connected to the controller 10 which is described later. The work operation detection sensor 19 is a position sensor to detect the position of the work operation lever 57.

The work vehicle 1 includes a gyro 20 to detect an angular acceleration of the vehicle body 2, a posture detection sensor 21 for detecting a posture of the vehicle body 2, a temperature sensor ST70 to detect a temperature of hydraulic fluid stored in the hydraulic fluid tank 70, a hydraulic pressure sensor SP21 to detect a hydraulic pressure of the oil passage PA21, a hydraulic pressure sensor SP22 to detect the hydraulic pressure of the oil passage PA22, a hydraulic pressure sensor SP23 to detect a hydraulic pressure of the oil passage PA23, a hydraulic pressure sensor SP82*a* to detect a hydraulic pressure of the hydraulic fluid passage 82*a*, a hydraulic pressure sensor SP82*b* to detect a hydraulic pressure of the hydraulic fluid passage 82*b*, an arm posture sensor SS45 such as an angle sensor (a potentiometer or the like) provided on the joint shaft 47 to detect an attitude of the arm 45 or a distance sensor to measure a length of the arm cylinder 48, and a load sensor SW21 to detect an load applied to the work implement 41. The posture detection sensor 21 can detect a roll angle (a tilt angle in the front-rear direction) and the pitch angle (a tilt angle in the left-right direction) of the vehicle body 2 by detecting a tilt of the vehicle body 2 in the front-rear, left-right directions with respect to the direction of gravity acceleration. Further, the posture detection sensor 21 can detect a yaw angle (an azimuth angle) of the vehicle body 2 by detecting an inclination of the vehicle body 2 in the front-rear direction with respect to the earth magnetism. The gyro 20 and the posture detection sensor 21 may be realized by an inertial measurement unit. A method of utilizing information from these sensors will be described later.

According to an embodiment of the present application, a single work operation lever 57 is configured to swing toward frontward or rearward so as to raise and lower the arm 45, and to swing leftward or rightward so as to operate the work implement 41 such as the bucket. Alternatively, at least one pair of the work operation levers 57 may be provided to swing one of the work operation levers so as to raise and lower the arm 45, and to swing the other of the work operation levers so as to operate the work implement 41. In this case, the operation valves 59*a* and 59*b* set the pilot pressure according to a swing of the one of the work operation levers 57, and the operation valves 59*c* and 59*d* set the pilot pressure according to a swing of the other of the work operation levers 57. That is, the arm 45 and the work implement 41 may be configured to perform a combined operation.

<Turning State>

Before describing the specific operation of the controller 10, a turning state according to the embodiment of the present application will be described. As described above, the turning state refers to an operation of the work vehicle 1 when the operation lever 55 is operated in the right or left direction between the G4 position and the G5 position. When the operation lever 55 is operated such that the operating position in the right direction or the left direction is between the G4 position and the G5 position, the primary pilot pressure Pc is applied to the first port PLa of the first hydraulic pump 7L and the fourth port PRb of the second hydraulic pump 7L, or to the second port PLb of the first hydraulic pump 7L and the third port PRa of the second hydraulic pump 7R. The primary pilot pressure Pc maximizes the displacement volume of each of the first hydraulic pump 7L and the second hydraulic pump 7R when no load is applied to the first hydraulic motor 31L and the second hydraulic motor 31R. The displacement volume of each of the first hydraulic pump 7L and the second hydraulic pump 7R may be smaller than its maximum volume even though the primary pilot pressure Pc is applied to the first hydraulic motor 31L and the second hydraulic motor 31R, when high load is applied to the first hydraulic motor 31L and the second hydraulic motor 31R. FIG. 4 shows the traveling primary pressure for maximizing the displacement volume of each of the first hydraulic pump 7L and the second hydraulic pump 7R corresponding to the rotational speed of the engine 6. When the drop amount of the engine 6 is less than an anti-stall determination value (the set line L1), and the engine rotational speed is equal to or greater than an idling speed RSi, the displacement volume of each of the first hydraulic pump 7L and the second hydraulic pump 7R is maximized when substantially no load is applied to the first hydraulic motor 31L and the second hydraulic motor 31R.

In such a turning state, since the turning radius is very short (approximately half of the width of the work vehicle 1), slipping amount of the crawler per unit movement distance is increased. Therefore, the traveling resistance increases. When the traveling resistance is large in order to reduce the traveling resistance, the work vehicle 1 performs automatic deceleration control by switching the first hydraulic motor 31L and the second hydraulic motor 31R to the first speed. Specifically, when the traveling resistance is large, the output of at least one of the hydraulic pressure sensors SP5L, SP6L, SP5R, and SP6R exceeds a predetermined threshold value, and based on this, the work vehicle 1 switches the first hydraulic motor 31L and the second hydraulic motor 31R to the first speed. The details of this automatic deceleration control are disclosed in, for example, Japanese Patent Laid-Open No. 2021-067147.

As described above, even when the automatic deceleration control is performed in the turning state, the swash plates of the first hydraulic pump 7L and the second hydraulic pump 7R are not stabilized due to the pressure of the drive oil passages PA5L, PA6L, PA5R, and PA6R caused by the influence of traveling resistance, and the pump capacity varies, thus the work vehicle 1 may vibrate back and forth. Such a state of the work vehicle 1 is referred to as "fluttering" of the work vehicle 1. The controller 10 carries out the following control in order to suppress such fluttering of the work vehicle 1.

<Detailed Operation of the Controller 10>

The controller 10 determines whether or not the traveling state of the work vehicle 1 is a turning state based on the operation of an operation device 56 (direction input device), and outputs a rotation command for reducing the target rotational speed of the engine 6 from a first rotational speed RS1 that is determined based on an operation amount of a setting member 11 to a second rotational speed RS2 when the traveling state is determined to be the turning state. That is, the controller 10 outputs a target rotational speed which is smaller than the first rotational speed RS1 that is determined based on the operation amount of the setting member 11. As a result, since the slipping amount of the crawler per unit time is reduced, the traveling resistance is reduced, thus fluttering of the work vehicle 1 is suppressed. However, since the operability is impaired if the speed is drastically reduced, the controller 10 is configured to control the pilot pressure control valve CV1 (hydraulic pressure adjustment mechanism) such that at least one of the pilot pressure in the pilot oil passage maximizes the displacement volume of each of the first hydraulic pump 7L and the second hydraulic pump 7R when substantially no load is applied to the first hydraulic motor 31L and the second hydraulic motor 31R. However, even if the pilot pressure is controlled such that the displacement volume of each of the first hydraulic pump 7L and the second hydraulic pump 7R can be maximized when substantially no load is applied to the first hydraulic motor 31L and the second hydraulic motor 31R, the pilot pressure should preferably be controlled to be as high as possible. This is because the swash plates of the first hydraulic pump 7L and the second hydraulic pump 7R can be easily stabilized to positions where the displacement volume of each of the first hydraulic pump 7L and the second hydraulic pump 7R is maximized against the pressure of the drive oil passages PA5L, PA6L, PA5R, PA6R caused by the influence of traveling resistance. The controller 10 includes a processor 10*a* and a memory 10*b* as shown in FIG. 7 in order to realize the processing described above. The memory 10*b* includes a volatile memory and a non-volatile memory. The memory 10*b* stores a travel control program 10*c*1 for realizing the above-described control, and a work control program 10*c*2 for controlling the operation of the work implement 41 (bucket) and the arm 45 at least. The processor 10*a* executes the above-described control while executing the travel control program 10*c*1 or executing both the travel control program 10*c*1 and the work control program 10*c*2. Hereinafter, a control method of the controller 10 will be described in detail.

FIG. 8 is a flowchart showing the operation of the controller 10 of the work vehicle 1. In this flowchart, the processes from step S1 to step S12 are executed at predetermined sampling intervals (e.g., 20 μs). In step S1, the temperature sensor ST70 detects the temperature of the hydraulic fluid, and the controller 10 determines whether or not the temperature of the hydraulic fluid detected by the temperature sensor ST70 is less than the threshold temperature. The threshold temperature is set to a temperature at which the viscosity of the hydraulic fluid becomes higher than a predetermined value. When the viscosity is high, the fluctuation of the pressure in the drive oil passages PA5L, PA6L, PA5R, and PA6R caused by the influence of the traveling resistance is reduced, and the fluttering of the work vehicle 1 is reduced. Therefore, when the temperature of the hydraulic fluid detected by the temperature sensor ST70 is lower than the threshold temperature (Yes in step S1), the engine speed reduction process is not performed. That is, the controller 10 outputs the rotation command which sets the target rotational speed to the first rotational speed RS1 determined based on the operation amount of the setting member 11 (Step S11). If the temperature of the hydraulic fluid detected by the temperature sensor ST70 is equal to or higher than the threshold temperature (No in step S1), the process proceeds to step S2.

In Step S2, any one of three things as follows is performed. (1) The arm posture sensor SS45 detects the posture of the arm 45 which is attached to the vehicle body 2 of the work vehicle 1 and which supports the work implement 41 (bucket) of the work vehicle 1. When a height of the arm 45 relative to the vehicle body 2 is equal to or greater than the predetermined threshold height (No in step S2), the process of the controller 10 proceeds to step S3. For example, whether the height of the arm 45 relative to the vehicle body 2 is equal to or greater than a predetermined threshold height can be determined by threshold processing of the output value of an angle sensor provided on the joint shaft 47 or threshold processing of the output value of a distance sensor that measures the length of the arm cylinder 48.

(2) The hydraulic pressure sensor SP21 and the hydraulic pressure sensor SP22 detect that the arm 45 is being operated based on the fluctuation from the respective pressure values. Alternatively, the operation of the arm 45 may be detected by the arm attitude sensor SS45. For example, it is possible to detect that the arm 45 is operated based on a time change of an output value of an angle sensor provided on the joint shaft 47 or a time change of an output value of a distance sensor that measures the length of the arm cylinder 48. When the arm 45 is operated (No in step S2), the process of the controller 10 proceeds to step S3.

(3) The hydraulic pressure sensors SP82*b* and SP82*a* detect that the operation of the work operation lever 57 is input by the change of the difference between their pressure values. Alternatively, the input of the operation of the work operation lever 57 may be detected by the operating position of the work operation lever 57 detected by the work operation detection sensor 19. When an operation of the work operation lever 57 is inputted (No in step S2), the process of the controller 10 proceeds to step S3. When the height of the arm 45 relative to the vehicle body 2 is less than a predetermined threshold height, the arm 45 is not operated, and the operation of the work operation lever 57 is not input (Yes in step S2), the engine rotational speed reduction process is not performed. That is, the controller 10 outputs a rotation command for setting the target rotational speed to the first rotational speed RS1 determined based on the operation amount of the setting member 11 (step S11). In the case of the arm operation in which "No" is obtained in step S2, the center of gravity of the work vehicle 1 changes, so that the fluttering is likely to occur. Thus, high workability can be secured by limiting the engine rotational speed when the fluttering is likely to occur. Note that step S2 may be omitted.

In step S3, the sensor 14 of the brake pedal 13 detects applying the hydraulic brake. Alternatively, the controller 10 determines whether all the pressures of the hydraulic sensors SP11 to SP14 are equal to or less than the travel secondary pressure Pd corresponding to the lever operating position G2 or are equal to or less than the pressure between Pa and Pd in consideration of hysteresis, i.e., whether all the front, rear, left and right operations are in the low speed range. The controller 10 outputs a rotation command for setting the target rotational speed to a first rotational speed RS1 that is determined based on the operation amount of the setting member 11 (Step S11) when all of the front, back, left, and right operations are in the low-speed range or when the hydraulic brake is not applied (Yes in step S3). When the front, back, left and right operations are all in the low speed range, or the hydraulic brake is applied, the moving speed is low, thus the fluttering hardly occurs. It is possible to ensure high workability by limiting the engine rotational speed when the fluttering is likely to occur. If NO in step S3, the process proceeds to step S4.

In step S4, the controller 10 determines whether the first rotational speed RS1 is less than a predetermined first threshold speed. When the first rotational speed RS1 is lower than the first threshold speed RSth1 (Yes in step S4), the controller 10 does not perform the process of reducing the engine rotational speed. That is, the controller 10 outputs a rotation command for setting the target rotational speed of the engine 6 to the first rotational speed RS1 (step S11). If the target rotational speed is reduced to the first threshold speed RSth1 or less, the risk of the engine 6 stalling increases. The first threshold speed RSth1 is, for example, 2208 rpm. Therefore, when the target rotational speed of the engine 6 is a rotational speed at which the risk of stalling of the engine 6 is high, the stalling can be suppressed by not performing the process of reducing the engine rotational speed. If NO in step S4, the process proceeds to step S5.

In step S5, the sensor 6*a* detects the rotational speed of the engine 6 (the actual rotational speed of the engine 6). When the detected actual rotational speed is lower than a predetermined second threshold speed RSth2 which is lower than the first threshold speed RSth1, the controller 10 outputs a rotational command for setting the target rotational speed of the engine 6 to the first rotational speed RS1 (step S11). If the actual rotational speed falls below the second threshold speed RSth2, there is a high risk that the engine 6 will stall. The second threshold speed RSth2 is, for example, 1750 rpm. Therefore, when the actual rotational speed of the engine 6 is a rotational speed at which the risk of stalling of the engine 6 is high, the stalling can be prevented by not performing the process of reducing the engine rotational speed. If NO in step S5, the process proceeds to step S6.

In step S6, at least one of the hydraulic sensors SP11 to SP14, the operation detection sensor 18, the gyro 20, the hydraulic sensors SP5L, SP6L, SP5R, SP6R, and the rotation sensors SR31L, SR31R detects the operation state of the operation device 56 (the direction input device) for operating the traveling direction of the work vehicle 1. Based on the detected operation state, the controller 10 determines whether or not the traveling state of the work vehicle 1 is the turning state. For example, (1) the controller 10 determines that the traveling state of the work vehicle 1 is the turning state when a value of a ratio of a pressure value of the hydraulic sensor SP11 to a pressure value of the hydraulic sensor SP14A is within a predetermined range close to 1 (e.g. between 0.9 and 1/0.9) and when a value obtained by multiplying an average value of a pressure value of the hydraulic pressure sensor SP11 and a pressure value of the hydraulic pressure sensor SP14 by a predetermined coefficient (for example, 0.5) is larger than a larger value of a pressure value of the hydraulic pressure sensor SP12 and a pressure value of the hydraulic pressure sensor SP13. Alternatively, the controller 10 determines that the traveling state of the work vehicle 1 is the turning state when a value of a ratio of a pressure value of the hydraulic pressure sensor SP12 to a pressure value of the hydraulic pressure sensor SP13 is within the predetermined range close to 1, and when a value obtained by multiplying an average value of a pressure value of the hydraulic pressure sensor SP12 and a pressure value of the hydraulic pressure sensor SP13 by a predetermined coefficient (for example, 0.5) is larger than a larger value of a pressure value of the hydraulic pressure sensor SP11 and a pressure value of the hydraulic pressure sensor SP14.

In other words, the controller 10 determines that the traveling state is the turning state, either both when a first pilot pressure (a pressure value of the hydraulic pressure sensor SP11) applied to the first port PLa for driving the first hydraulic pump 7L forward and a fourth pilot pressure (a pressure value of the hydraulic pressure sensor SP14) applied to the fourth port PRb for driving the second hydraulic pump 7R backward are substantially equal, and when an average of the first pilot pressure and the fourth pilot pressure is greater than a larger value of a second pilot pressure (a pressure value of the hydraulic sensor SP12) applied to the second port PLb for driving the first hydraulic pump 7L backward and a third pilot pressure (a pressure value of the hydraulic sensor SP12) applied to the third port PRa for driving the second hydraulic pump 7R forward, or both when the second pilot pressure and third pilot pressure is substantially equal, and when an average of the second pilot pressure and the third pilot pressure is greater than a larger value of the first pilot pressure and the fourth pilot pressure. Since the primary pilot pressure is applied to the first port PLa and the fourth port PRb (the second port PLb and the third port PRa) when the operation lever 55 is operated in the left-right direction in the almost full operation range RA2, the first pilot pressure and the fourth pilot pressure (the second pilot pressure and the third pilot pressure) are substantially equal. Further, since the operation lever 55 is not operated in the almost full operation range RA2 in the front-rear direction, a pressure equal to or less than Pb that is smaller than the primary pilot pressure should be output to the remaining ports, and the average of the first pilot pressure and the fourth pilot pressure (an average of the second pilot pressure and the third pilot pressure) should be larger than a larger value of the second pilot pressure and the third pilot pressure (the first pilot pressure and the fourth pilot pressure). The controller 10 detects the state of the operation lever as described above based on the output values of the hydraulic sensors SP11 to SP14.

(2) When the operating position in the left-right direction of the operation detection sensor 18 which is detected by the operation detection sensor 18 is between the G4 position and the G5 position, the controller 10 determines that the traveling state of the work vehicle 1 is the turning state. That is, the controller 10 determines that the traveling state is the turning state when a displacement from the neutral position of the operation lever 55 (direction input device) for instructing movement in the left-right direction is equal to or greater than the first displacement value described above and when a displacement from the neutral position of the operation lever 55 (direction input device) for instructing movement in the front-back direction is less than the second displacement value.

(3) When the angular acceleration detected by the gyro 20 exceeds a predetermined threshold value which can be regarded as the turning state, the controller 10 determines that the traveling state of the work vehicle 1 is the turning state. This threshold value increases as the first rotational speed RS1 increases. For example, the threshold value may be set to a value larger than an angular acceleration affected by the turning speed when the pilot pressure Pb is applied to the first port PLa and the fourth port PRb (the second port PLb and the third port PRa) for each first rotational speed RS1.

(4) The controller 10 determines that the traveling state of the work vehicle 1 is the turning state either: all of when an absolute value of a pressure difference of the drive oil passages PA5R, PA6R (a difference between an oil pressure of the first connection port 31P1 and an oil pressure of the second connection port 31P2) is not less than a predetermined turning determination threshold pressure and when an absolute value of a pressure difference of the drive oil passages PA5R, PA6R (a difference between the oil pressure of the third connection port 31P3 and the oil pressure of the fourth connection port 31P4 is not less than a predetermined turning determination threshold pressure, and when an oil pressure of the first connection port 31P1 is higher than an oil pressure of the second connection port 31P2 and when an oil pressure of the fourth connection port 31P4 is higher than an oil pressure of the third connection port 31P3; or all of when the oil pressure of the second connection port 31P2 is higher than the oil pressure of the first connection port 31P1 and when an oil pressure of the third connection port 31P3 is higher than the oil pressure of the fourth connection port 31P4. The turning threshold pressure increases as the first rotational speed RS1 increases. The turning threshold pressure may be set to a value larger than the differential pressure obtained from the measurement result by measuring, for example, the hydraulic pressure received by each of the connection ports when the pilot pressure Pb is applied to the first port PLa and the fourth port PRb (the second port PLb and the third port PRa) at each first rotational speed RS1 in an ideal environment with low traveling resistance.

(5) The controller 10 determines that the traveling state of the work vehicle 1 is the turning state if the directions of rotations obtained from the output of rotation sensors SR31L, SR31R are opposite to each other and the rotation speeds obtained from the output of rotation sensors SR31L, SR31R are within the range of rotational speed estimated from an engine target rotational speed (the first rotational speed RS1). This is because in the above-described embodiment, the reduction ratio between the hydraulic motor and the hydraulic pump is generally within a predetermined range. As the first rotational speed RS1 increases, the upper limit and the lower limit of the rotational speed range increase. Specifically, for example, the lower limit of the range may be set to a value obtained by adding a predetermined margin to the values output from the rotation sensors SR31L and SR31R when the pilot pressure Pb is applied to the first port PLa and the fourth port PRb (the second port PLb and the third port PRa) for each first rotational speed RS1 in an ideal environment with low traveling resistance. The upper limit of the range may be, for example, a value output from the rotation sensors SR31L and SR31R when the pilot pressure Pc is applied to the first port PLa and the fourth port PRb (the second port PLb and the third port PRa) at each first rotational speed RS1 in an ideal environment with low traveling resistance. The controller 10 may determine that the traveling state of the work vehicle 1 is the turning state based on a combination of the conditions described in (1) to (5).

In step S7, when the controller 10 determines that the traveling state is the turning state (Yes in step S6), the controller 10 outputs a rotation command for reducing the target rotational speed of the engine 6 from the first rotational speed RS1 to the second rotational speed RS2. The second rotational speed RS2 is a value obtained by multiplying the first rotational speed RS1 by a predetermined ratio. The predetermined ratio is, for example, 0.92.

Since the speed difference between the second rotational speed RS2 that is described above and the first rotational speed RS1 is larger than the stall determination speed difference described above, the actual rotational speed rapidly decreases, and the primary pilot pressure is normally controlled according to the set line L2. However, in step S8, when it is determined that the traveling state is the turning state, the controller 10 controls the primary pilot pressure to a pressure corresponding to the second rotational speed RS2 based on the first correspondence following the set line L1. In FIG. 4, the line L3 indicates the primary pilot pressure required to maximize the displacement volume of each of the first hydraulic pump 7L and the second hydraulic pump 7R when substantially no load is applied to the first hydraulic motor 31L and the second hydraulic motor 31R. Such a primary pilot pressure is called a maximum volume threshold pressure. The displacement volume of each of the first hydraulic pump 7L and the second hydraulic pump 7R may be smaller than its maximum volume even though the maximum volume threshold pressure is applied to the first hydraulic motor 31L and the second hydraulic motor 31R, when high load is applied to the first hydraulic motor 31L and the second hydraulic motor 31R. The maximum volume threshold pressure changes in accordance with an engine speed. When the first rotational speed RS1 is set in a range higher than the first threshold speed RSth1, the primary pilot pressure (indicated by ○ in the figure) according to the set line L1 corresponding to the second rotational speed RS2 is larger than the maximum volume threshold pressure (indicated by Δ in the figure).

Therefore, it can be said that when it is determined that the traveling state is the turning state, the controller 10 controls the primary pilot pressure to be larger than the maximum volume threshold pressure which maximizes the displacement volume of each of the first hydraulic pump 7L and the second hydraulic pump 7R when substantially no load is applied to the first hydraulic motor 31L and the second hydraulic motor 31R. It can be said that the displacement volume of each of the first hydraulic pump 7L and the second hydraulic pump 7R is controlled so as to be maximized when substantially no load is applied to the first hydraulic motor 31L and the second hydraulic motor 31R.

Here, in a case that the first rotational speed RS1 is relatively large, in which the control according to the present embodiment is often conducted, the primary pilot pressure (indicated by Q in the figure) may be larger than the maximum volume threshold pressure (indicated by A in the figure) even if the anti-stall control is performed. However, if the primary pilot pressure can be set to a value sufficiently larger than the maximum volume threshold pressure by controlling the primary pilot pressure to a pressure corresponding to the second rotational speed RS2 based on the first correspondence following the set line L1 as in the present embodiment, it is possible to easily stabilize the swash plates of the first hydraulic pump 7L and the second hydraulic pump 7R at positions at which the displacement volume of each of the first hydraulic pump 7L and the second hydraulic pump 7R is maximized against the pressure applied to the driving oil passages PA5L, PA6L, PA5R, and PA6R due to influence of the traveling resistance. Therefore, the displacement volume of each of the first hydraulic pump 7L and the second hydraulic pump 7R is less likely to vary, and the fluttering can be further suppressed.

When the controller 10 determines that the traveling state is not the turning state (No in step S6), the controller 10 determines in step S9 whether or not the traveling state is a straight movement state. The straight movement state is a state in which two conditions (1) (2) are satisfied: (1) the pilot pressures relating to the ports (the first port PLa, the third port PRa) for allowing the output shaft of the first hydraulic pump 7L and the output shaft of the second hydraulic pump 7R to rotate in the forward direction is sufficiently larger than the pilot pressures relating to the ports (the second port PLb, the fourth port PRb) for allowing the output shaft of the first hydraulic pump 7L and the output shaft of the second hydraulic pump 7R to rotate in the reverse direction. Alternatively, the pilot pressures relating to the ports (the second port PLb, the fourth port PRb) for allowing the output shaft of the first hydraulic pump 7L and the output shaft of the second hydraulic pump 7R to rotate in the backward direction is sufficiently larger than the pilot pressures relating to the ports (the first port PLa, the third port PRa) for allowing the output shaft of the first hydraulic pump 7L and the output shaft of the second hydraulic pump 7R to rotate in the forward direction; (2) two pilot pressures of the hydraulic pumps which are determined to be larger are substantially equal (the ratio of the two pilot pressures is within a predetermined range close to 1 (for example, between 0.9 and 1/0.9)).

A state quantity for defining such a state is called a straightness degree. The controller 10 calculates the straightness degree by the following algorithm. Let the first pilot pressure applied to the first port PLa (the pressure value of the hydraulic sensor SP11) be lf(t). Let the second pilot pressure applied to the second port PLb (pressure value of the hydraulic sensor SP12) be lb(t). Let the third pilot pressure applied to the third port PRa (pressure value of the hydraulic sensor SP12) be rf(t). Let the fourth pilot pressure applied to the fourth port PRb (pressure value of the hydraulic sensor SP14) be rb(t). First, it is determined which of lf(t)/rf(t) and lb(t)/rb(t) is within a predetermined range close to 1 (for example, between 0.9 and 1/0.9). lf(t)/rf(t) is determined to be within the predetermined range, the larger value of lb(t) and rb(t) is assigned to a variable $PV_F$straight. When it is determined that lb(t)/rb(t) is within the predetermined range, the larger value of lf(t) and rf(t) is substituted into a variable $PV_B$straight.

If a value is assigned to $PV_F$straight, $S_F$ratio(t), the straightness degree in the forward direction is obtained by equation (1). When a value is assigned to $PV_B$straight, $S_B$ratio(t), the straightness degree in the backward direction can be obtained by the equation (2).

$$S_F\text{ratio}(t)=\{lf(t)+rf(t)\}/\{2\times PV_F\text{straight}\} \quad (1)$$

$$S_B\text{ratio}(t)=\{lb(t)+rb(t)\}/\{2\times PV_B\text{straight}\} \quad (2)$$

When the $S_F$ratio(t) or the $S_B$ratio(t) exceeds a predetermined threshold value (for example, 300 or more), it is determined that the above two conditions are satisfied, and the controller 10 determines that the traveling state is the straight movement state.

When the controller 10 determines that the traveling state is neither the straight movement state nor the turning state (No in step S9), the controller 10 outputs a rotation command so that the target rotational speed of the engine 6 is increased stepwise from the second rotational speed RS2 to the first rotational speed RS1 (step S10). This increase method may be either rapid or gradual. In the case of stepwise increase, when No is determined in step S9 for each sampling interval described above, a value obtained by multiplying the predetermined ratio for obtaining the second rotational speed RS2 gradually close to 1 by the first rotational speed RS1 is set as the target rotational speed of the engine 6. Since the traveling state is an intermediate state between the straight movement state and the turning state in the state in which "No" is obtained in step S9, if the target rotational speed is gradually increased, the decelerating state between the straight movement state and the turning state can be made smooth, and the operation feeling of the user can be improved. When the step S10 ends, the process proceeds to step S8.

When the step S10 or S11 ends, the process proceeds to step S12. In the step S12, the controller 10 moves the work vehicle 1 based on the pilot pressure and the target rotational speed set as described above. Specifically, the controller 10 drives the first hydraulic pump 7L and the second hydraulic pump 7R by the engine 6 of the work vehicle 1 on the basis of the pilot pressure and the target rotational speed set as described above, thereby supplying hydraulic fluid to the first hydraulic motor 31L and the second hydraulic motor 31R to drive the first traveling device 3L and the second traveling device 3R arranged opposite to each other, thereby executing a process for moving the work vehicle 1.

Operation and Effect of First Embodiment

According to the first embodiment, a method for controlling the work vehicle 1 or a process performed by the controller 10 of the work vehicle 1 determines whether or not a traveling state of the work vehicle 1 is a turning state, and when the traveling state is determined to be the turning state, outputs a rotation command for reducing a target rotational speed of the engine 6 from a first rotational speed RS1 to a second rotational speed RS2, and controls the pilot pressure of pilot oil supplied to the first hydraulic pump 7L and the second hydraulic pump 7R so as to maximize the displacement volume of the first hydraulic pump 7L and the second hydraulic pump 7R, respectively, when substantially no load is applied to the first hydraulic motor 31L and the second hydraulic motor 31R. Therefore, it is possible to provide the work vehicle 1 which can improve the safety of turning while suppressing deceleration during turning.

Modifications of First Embodiment

In the first embodiment, part or all of the processes of steps S1 to S2, and various sensors corresponding to these processes may be omitted. The sensor for determining the turning state and part of the determination process thereof may also be omitted.

The determination of the straight movement state may also be made by other than the pilot pressure. For example, based on the output of the rotation sensor SR31L of the first hydraulic motor 31L and the output of the rotation sensor SR31R of the second hydraulic motor 31R, it may be determined by an algorithm to determine whether directions of the rotations and the absolute values of the rotational speeds are substantially equal. The straightness degree may be determined by the operation detection sensor 18, the gyro 20, and the hydraulic pressures of the drive oil passages PA5L, PA6L, PA5R, and PA6R.

The first pilot pressure applied to the first port PLa, the second pilot pressure applied to the second port PLb, the third pilot pressure applied to the third port PRa, and the fourth pilot pressure applied to the fourth port PRb may be controlled not only by controlling the primary pilot pressure input to the operation device 56 but also by controlling the secondary pilot pressure output from the operation device 56 in accordance with the traveling state.

The various threshold values may be changed in accordance with characteristics of the first hydraulic pump 7L, the second hydraulic pump 7R, the first hydraulic motor 31L, and the second hydraulic motor 31R, characteristics of the reduction gear connected to the first hydraulic motor 31L and the reduction gear connected to the second hydraulic motor 31R, and characteristics of the various control valves.

Second Embodiment

Figure 9A:
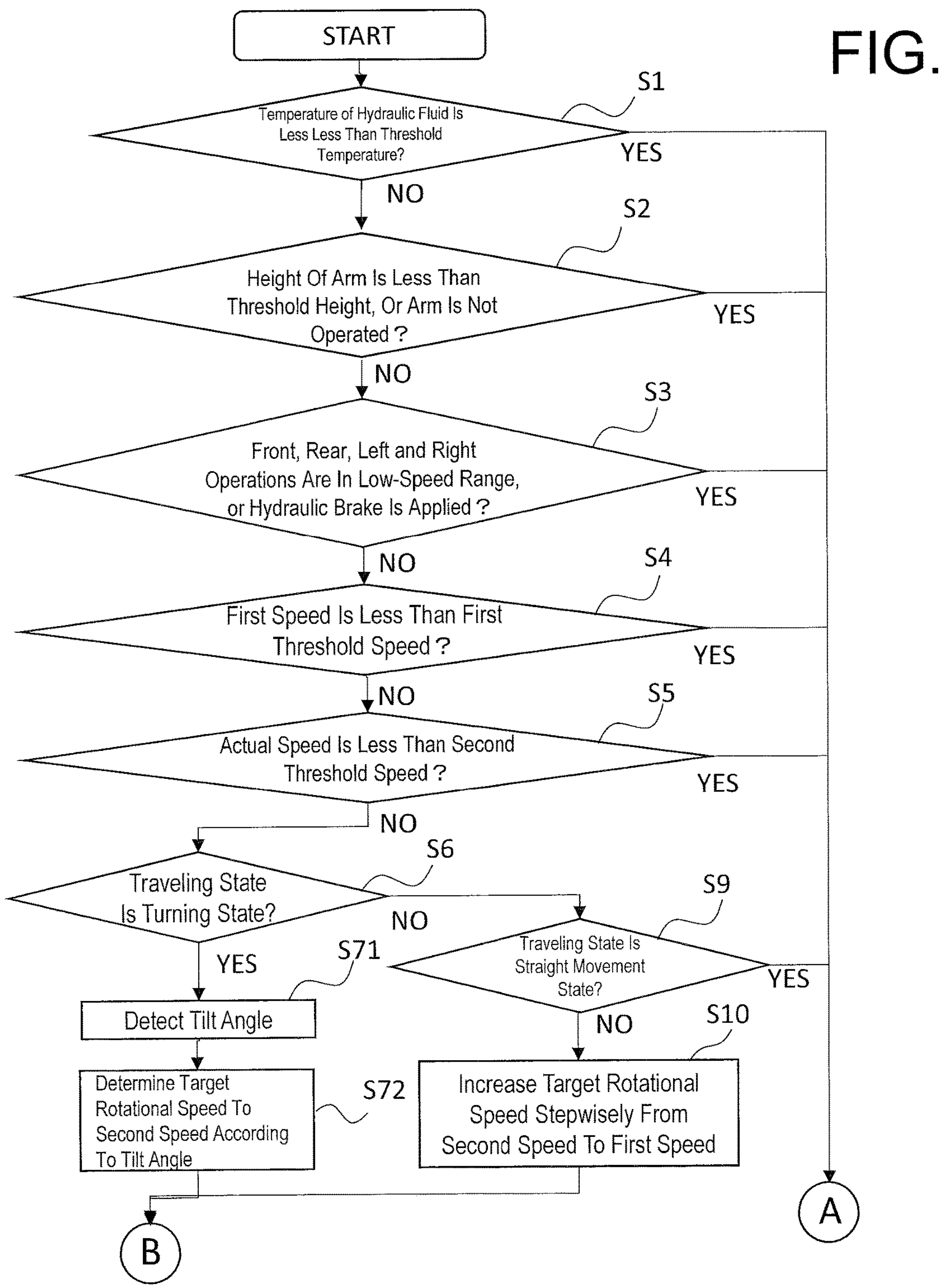
FIG. 9A is a flowchart showing the operation of the controller of the work vehicle according to the second embodiment.
Figure 9B:
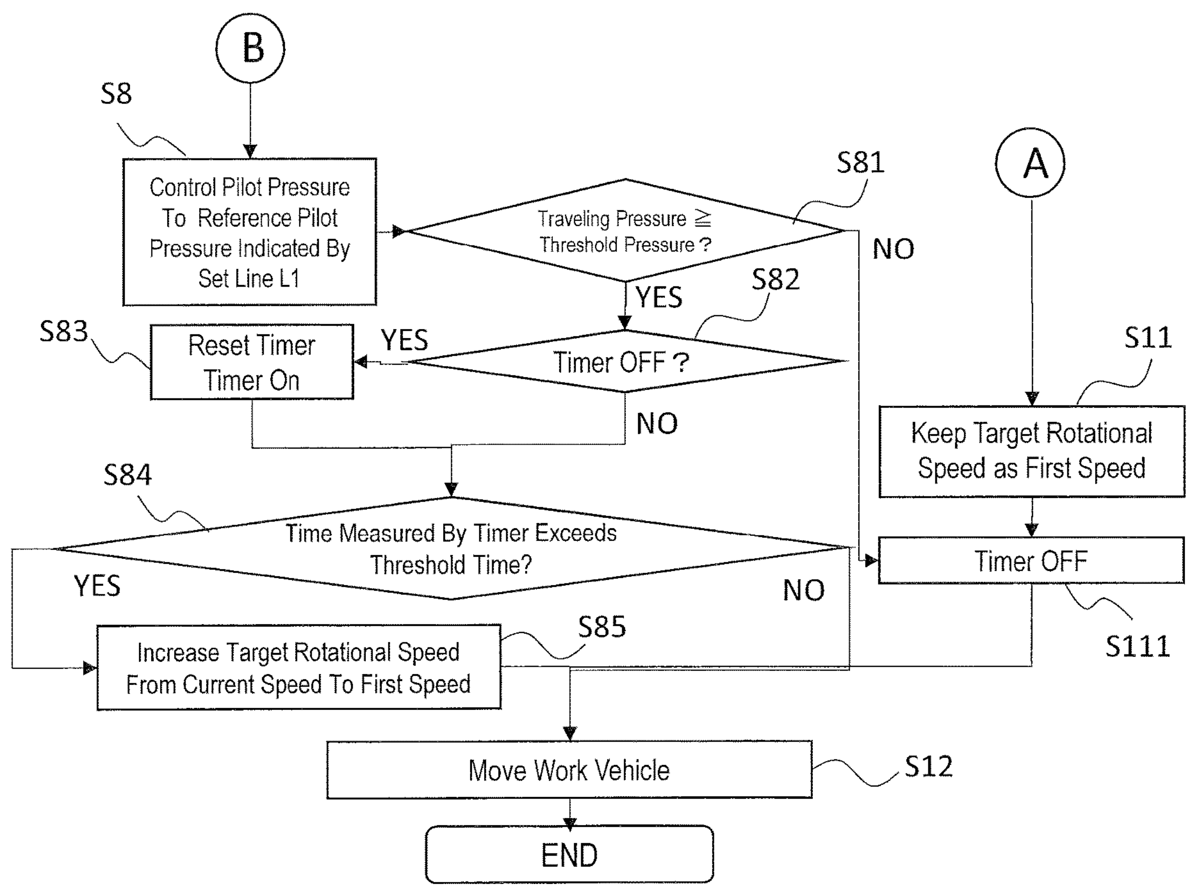
FIG. 9B is a flowchart showing the operation of the controller of the work vehicle according to the second embodiment.

The operation of the controller 10 of the work vehicle 1 is not limited to the operation shown in the flowchart of FIG. 8 according to the first embodiment. The second embodiment describes an operation of the controller 10 different from that of the first embodiment. Since the hardware configuration of the work vehicle 1 according to the second embodiment is the same as that of the first embodiment, the description thereof is omitted. FIGS. 9A and 9B are flowcharts showing the operation of the controller 10 of the work vehicle 1 according to the second embodiment. In FIGS. 9A and 9B, the same operations as those in FIG. 8 are denoted by the same reference numerals, and the description thereof is omitted.

In the second embodiment, instead of step S7 in FIG. 8, the controller 10 executes steps S71 and S72. In step S71, the work vehicle 1 uses the posture detection sensor 21 to measure at least one tilt angle of the front and rear tilt angles (pitch angle) and the left and right tilt angles (roll angle) of the work vehicle 1. In step S72, the controller 10 determines the above-described second rotational speed according to at least one tilt angle.

More specifically, when the at least one tilt angle is less than a predetermined first threshold angle, the controller 10 equalizes the second rotational speed described above to the first rotational speed described above. The first threshold angle is empirically determined. Note that the first threshold angle when at least one tilt angle is a pitch angle and the first threshold angle when at least one tilt angle is a roll angle may be different from each other. When at least one tilt angle includes both a pitch angle and a roll angle, and when the pitch angle is less than a first threshold angle corresponding to the pitch angle and the roll angle is less than a first threshold angle corresponding to the roll angle, the controller 10 equalizes the second rotational speed to the first rotational speed.

When at least one tilt angle is equal to or greater than the first threshold angle and less than a second threshold angle larger than the first threshold angle, the controller 10 set the second rotational speed RS2 to be a value obtained by multiplying the first rotational speed by a predetermined first ratio. The second threshold angle is empirically determined. The second threshold angle when at least one tilt angle is a pitch angle may be different from the second threshold angle when at least one tilt angle is a roll angle. When at least one tilt angle includes both a pitch angle and a roll angle, when the pitch angle is not less than a first threshold value corresponding to the pitch angle but less than a second threshold value corresponding to the pitch angle, and the roll angle is not less than a first threshold value corresponding to the roll angle but less than a second threshold value corresponding to the roll angle, the controller 10 sets the second rotational speed to a value obtained by multiplying the first rotational speed by a predetermined first ratio. The first ratio may be equal to the predetermined ratio in step S7 according to the first embodiment.

When at least one tilt angle is equal to or greater than the second threshold angle, the controller 10 sets the second rotational speed RS2 to a value obtained by multiplying the first rotational speed by a predetermined second ratio which is smaller than the first ratio. If the pitch angle is equal to or greater than a second threshold angle corresponding to the pitch angle or if the roll angle is equal to or greater than a second threshold angle corresponding to the roll angle, when at least one tilt angle includes both a pitch angle and a roll angle, the controller 10 sets the second rotational speed to a value obtained by multiplying the first rotational speed by a second ratio. With the above-described processing, it is possible to suppress the fluttering by reducing the engine rotational speed only when the fluttering of the work vehicle 1 occurs (at least one tilt angle is equal to or greater than the first threshold angle), more specifically, it is possible to further suppress the fluttering by further reducing the engine rotational speed when the fluttering of the work vehicle 1 is particularly severe (at least one tilt angle is equal to or greater than the second threshold angle).

Further, in the second embodiment, in step S81 after the step S8, the controller 10 obtains hydraulic pressures detected by the hydraulic sensors SP5L, SP6L, SP5R and SP6R, and determines whether or not a traveling pressure is equal to or greater than a threshold pressure, the traveling pressure being at least one of a hydraulic pressure of the hydraulic circuit CL connecting the first hydraulic pump 7L and the first hydraulic motor 31L (a difference between pressures of the hydraulic sensors SP5L and SP6L) and a hydraulic pressure of the hydraulic circuit CR connecting the second hydraulic pump 7R and the second hydraulic motor 31R (a difference between pressures of the hydraulic sensors SP5R and SP6R) is equal to or greater than a threshold pressure. This threshold pressure is a value determined empirically. When the traveling pressure is equal to or greater than the threshold pressure (YES in step S81), the controller 50 resets and activates the timer if the timer is not activated (NO in step S82). When the timer is activated (NO in step S82), the controller 50 executes step S84. When the traveling pressure is less than the threshold pressure (NO in step S81) or when the process proceeds to step S11 described above, the controller 50 turns off the timer (step 111).

In step S84, the controller 50 determines that the duration in which the traveling pressure remains at or above the threshold pressure exceeds a threshold time or not. Specifically, the controller 50 determines whether or not the time measured by the timer exceeds the threshold time. When the time for which the traveling pressure continues to be equal to or greater than the threshold pressure exceeds the threshold time (YES in step S84), the controller 50 outputs the rotation command so as to further increase the target rotational speed from the second rotational speed RS2 to the first rotational speed (step S85). When the rotational speed is increased in step S10, the target rotational speed is set to a rotational speed that is closer to the first rotational speed than the rotational speed determined in step S10. When the step S85 or the step S111 is completed or NO in the step S84, the controller 50 executes the process of the step S12. By the processing of the steps S81 to S85, it is possible to reduce the risk of the engine stalling when the engine load is large.

Modifications of First Embodiment and Second Embodiment

Figure 10A:
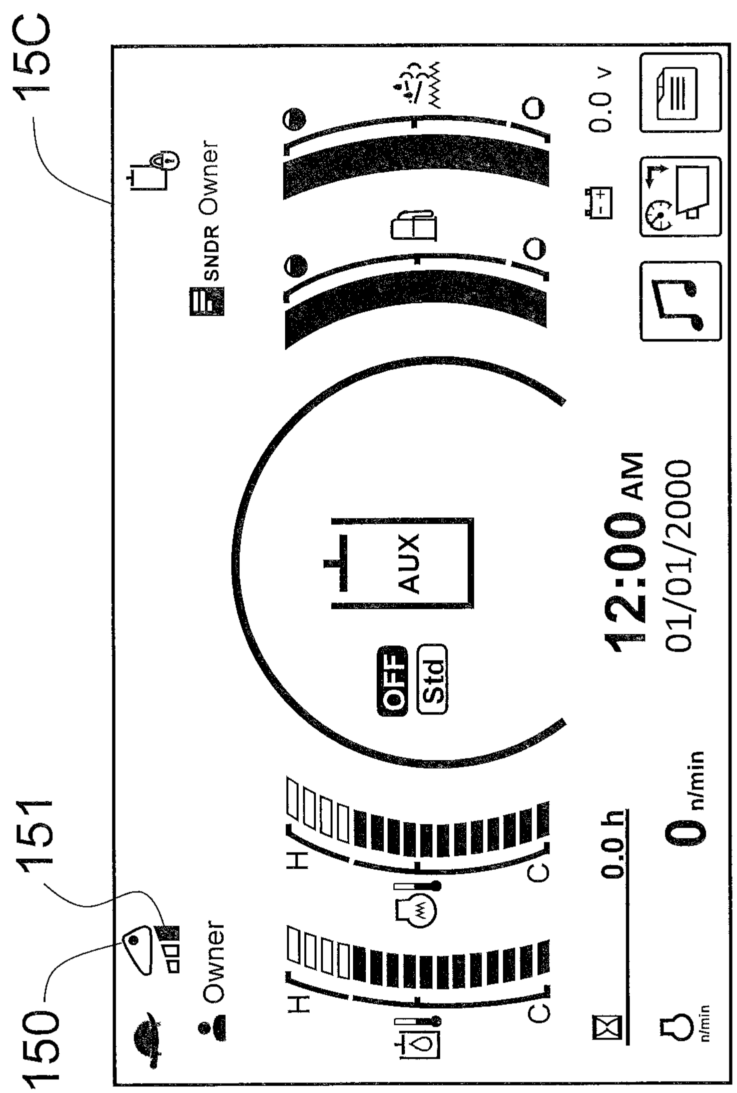
FIG. 10A shows a display example of an operation panel of a work vehicle according to a modification of the first and second embodiments.
Figure 10B:
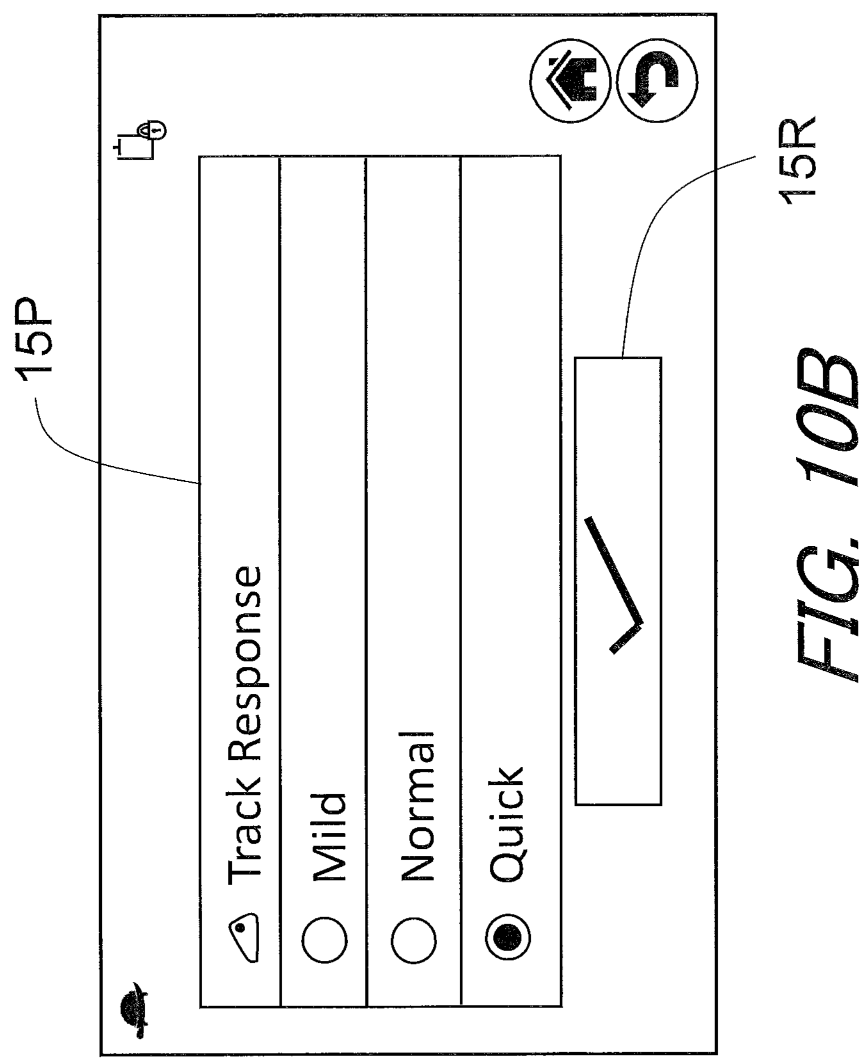
FIG. 10B shows a display example of an operation panel of a work vehicle according to a modification of the first and second embodiments.
Figure 10C:
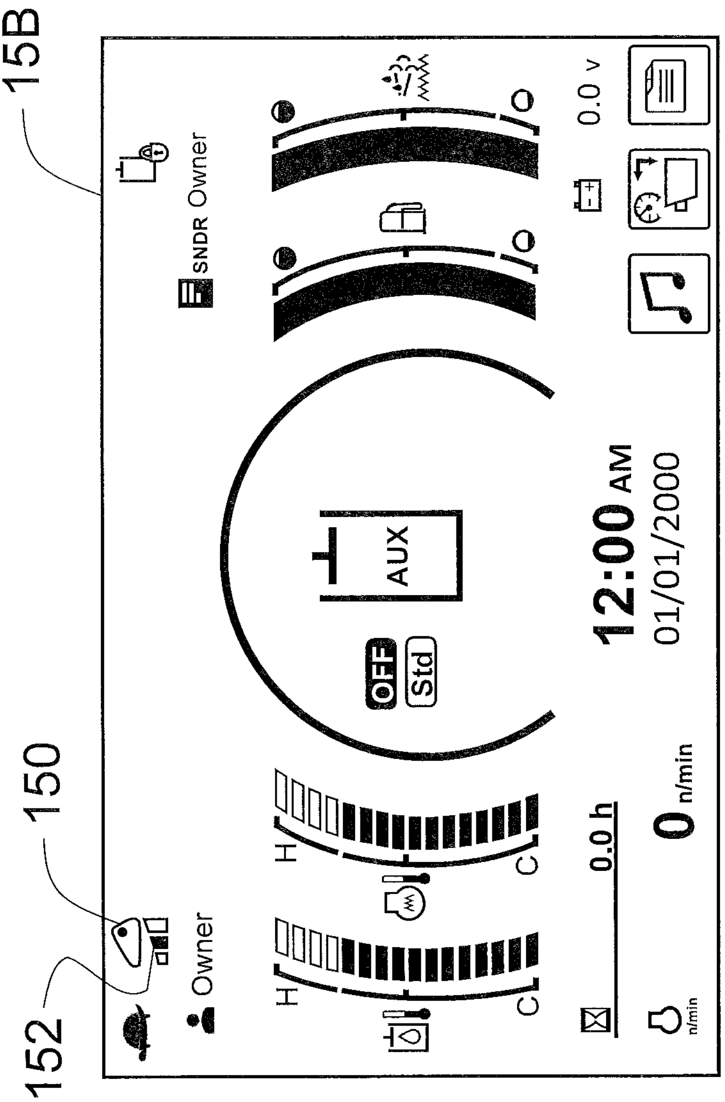
FIG. 10C shows a display example of an operation panel of a work vehicle according to a modification of the first and second embodiments.
Figure 10D:
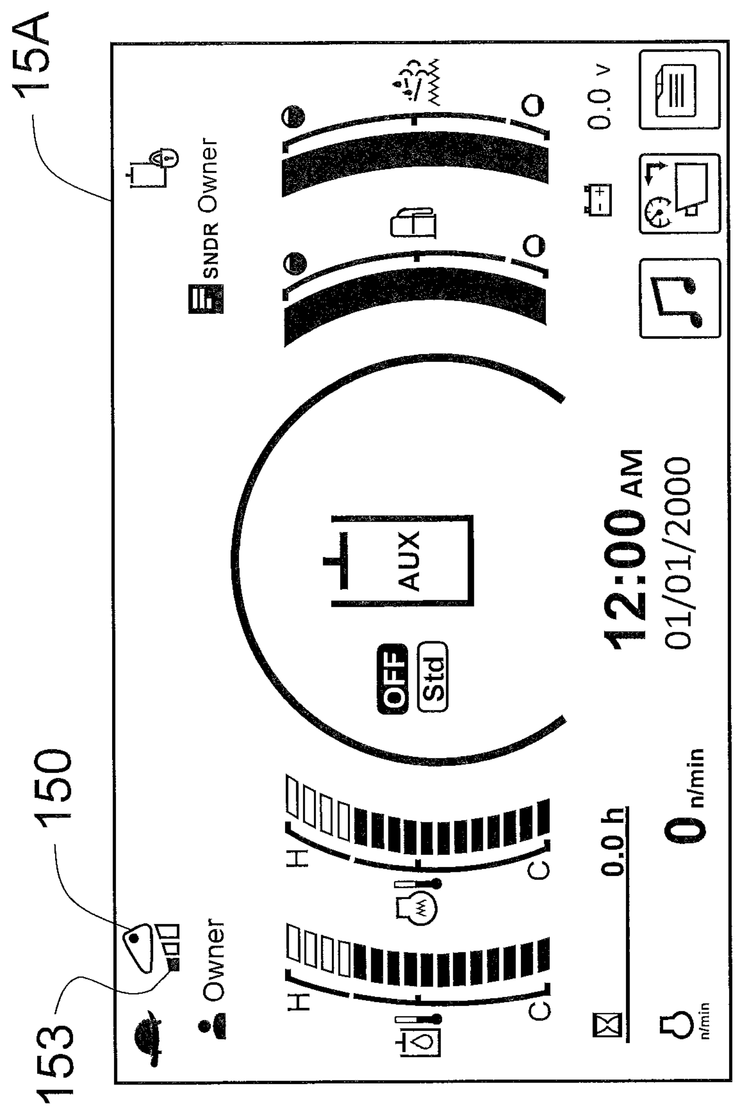
FIG. 10D shows a display example of an operation panel of a work vehicle according to a modification of the first and second embodiments.

The processing of the first and second embodiments described above may be changed by setting of the operation panel 15. FIGS. 10A to 10D show display examples of the operation panel 15 of the work vehicle according to the modification of the first and second embodiments. FIG. 10A shows a display screen 15A of the operation panel 15 when the processes of FIGS. 8, 9A and 9B is not executed. That the process of FIGS. 8, 9A, and 9B is not executed means that processes of steps S1 to S10, S71, 872, S81 to S85, and S111 are omitted, i.e., the target rotational speed is not changed to the second rotational speed RS2. The display screen 15A includes a setting icon 150 and a status display gauge 151. When the setting icon 150 is touched, a pop-up window 15P shown in FIG. 10B is displayed. In the pop-up window 15P, Quick Mode means a mode in which the target rotational speed is not changed to the second rotational speed RS2. The Quick mode may be referred to as a first mode. In Normal mode and Mild mode, the processes of steps S1 to S10, S71, S72, S81 to S85, and S111 are executed, but the predetermined ratio in step S7, the first ratio in step S72, and the second ratio of the Normal mode is larger than the predetermined ratio in step S7, the first ratio in step S72, and the second ratio in step S72 of the Mild mode. In other words, in the Mild mode, the speed is greatly reduced. When a radio button at the right end of the pop-up window 15P is used to select a desired mode, and the decision button 15R is tapped, the mode selected by the radio button is set. FIG. 10A shows the status display gauge 151 in the Quick mode. FIG. 10C shows the status display gauge 152 in the normal mode, and FIG. 10D shows the status display gauge 153 in the mild mode.

As described above, by providing the interface of the operation panel 15, the method of controlling the work vehicle 1 can further include selecting one mode from a plurality of modes. Among the plurality of modes, the ratio of the second rotational speed to the first rotational speed is different. and different predetermined ratios of the step S7, or different combinations of the first ratio of the step S72 and the second ratio of the step S72 are set. The second rotational speed, the predetermined ratio in the step S7 and the first ratio and the second ratio in the step S72 are determined according to one of the selected modes. When the first mode (Quick mode), which is one of the plurality of modes, is selected, the controller 50 outputs a rotation command to make the target rotational speed the first rotational speed even if it is determined that the traveling state is the turning state. By providing such a mode, it is possible to perform control in accordance with a user's preference.

The operation panel 15 described above may not be a touch panel, and the mode may be set by an input device such as a dial or a key provided on the operation panel 15. Also, the number of modes may be two or four or more. When there are two modes, the above first mode and other modes are selected. When there are four or more modes, different values may be adopted for the predetermined ratio in the step S7 and the first ratio and the second ratio in the step S72 depending on the mode.

As used herein, "comprising" and its derivatives are non-limiting terms that describe the presence of a component, and do not exclude the presence of other components not described. This also applies to "having", "including" and their derivatives.

The terms "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:

1. A method for controlling a work vehicle, comprising:
- driving a first hydraulic pump and a second hydraulic pump by an engine of the work vehicle to supply hydraulic fluid to a first hydraulic motor and a second hydraulic motor, respectively, to drive a first traveling device and a second traveling device, respectively, to advance the work vehicle, the first traveling device and the second traveling device facing each other;
- detecting an operation state of a direction input device to operate a traveling direction of the work vehicle;
- determining whether or not a traveling state of the work vehicle is a turning state based on the operation state that is detected;
- outputting a rotation command to decrease a target rotational speed of the engine from a first rotational speed to a second rotational speed when it is determined that the traveling state is the turning state; and controlling pilot pressures of pilot oil supplied to the first hydraulic pump and the second hydraulic pump to be target pilot pressures, displacement volumes of the first hydraulic pump and the second hydraulic pump to which the target pilot pressures are applied respectively being maximized when substantially no load is applied to the first hydraulic motor and the second hydraulic motor.

2. The control method according to claim 1, further comprising:

determining the first rotational speed based on an amount of operation of a speed input device different from the direction input device of the work vehicle; and outputting the rotation command to set the target rotational speed of the engine of the work vehicle to the first rotational speed, when the first rotational speed is lower than a first threshold speed that is predetermined, even if it is determined that the traveling state is the turning state.

3. The control method according to claim 2, wherein the second rotation speed is a value obtained by multiplying the first rotational speed by a predetermined ratio.

4. The control method according to claim 2, further comprising:

measuring a pitch angle which is a tilt angle of the work vehicle in a front-back direction of the work vehicle when it is determined that the traveling state is the turning state; and determining the second rotational speed is determined in accordance with the pitch angle.

5. The control method according to claim 2, further comprising:

measuring a roll angle which is a tilt angle of the work vehicle in a left-right direction of the work vehicle when it is determined that the traveling state is the turning state; and determining the second rotational speed in accordance with the roll angle.

6. The control method according to claim 4, wherein the second rotational speed is determined to be equal to the first rotational speed when the pitch angle is less than a predetermined first threshold angle.

7. The control method according to claim 6, wherein when the pitch angle is equal to or greater than the first threshold angle and less than a second threshold angle larger than the first threshold angle, the second rotational speed is determined to be a value obtained by multiplying the first rotational speed by a first ratio that is predetermined, and wherein when the pitch angle is equal to or greater than the second threshold angle, the second rotational speed is determined to be a value obtained by multiplying the first rotational speed by a second ratio which is predetermined and is smaller than the first ratio.

8. The control method according to claim 3, further comprising:

detecting a rotational speed of the engine, wherein the rotation command to set the target rotational speed to the first rotational speed is output when the rotational speed of the engine which is detected is equal to or lower than a second threshold speed which is predetermined and lower than the first threshold speed.

9. The control method according to claim 1, further comprising:

detecting a temperature of the hydraulic fluid, wherein the rotation command to set the target rotational speed to the first rotational speed is output when the temperature is less than a predetermined threshold temperature.

10. The control method according to claim 1, wherein the rotation command to set the target rotational speed to the first rotational speed is output neither when a height of an arm of the work vehicle with respect to a vehicle body of the work vehicle is equal to or greater than a predetermined threshold height nor when the operation is performed.

11. The control method according to claim 1, further comprising:

determining whether or not the traveling state has become a straight advancing state after the traveling state has become the turning state, wherein when it is determined that the traveling state has become the straight advancing state, the rotation command to set the target rotational speed of the engine to the first rotational speed is output.

12. The control method according to claim 11, wherein when it is determined that the traveling state is neither the straight advancing state nor the turning state, the rotation command to increase the target rotational speed of the engine from the second rotational speed to the first rotational speed is output.

13. The control method according to claim 12, wherein when a time for which at least one of a hydraulic pressure of a hydraulic circuit connecting the first hydraulic pump and the first hydraulic motor and a hydraulic pressure of a hydraulic circuit connecting the second hydraulic pump and the second hydraulic motor continues to be equal to or greater than a threshold pressure exceeds a threshold time, the rotation conmmand to further increase the target rotational speed from the second rotational speed to the first rotational speed is output.

14. The control method according to claim 1, wherein, when a time for which at least one of a hydraulic pressure of a hydraulic circuit connecting the first hydraulic pump and the first hydraulic motor and a hydraulic pressure of a hydraulic circuit connecting the second hydraulic pump and the second hydraulic motor continues to be equal to or greater than a threshold pressure exceeds a threshold time, the rotation command to further increase the target rotational speed from the second rotational speed to the first rotational speed is output.

15. The control method according to claim 1, wherein it is determined that the traveling state is the turning state when a degree of a first displacement according to which movement in the left-right direction is instructed is not less than a first displacement value and a degree of a second displacement according to which movement in the front-rear direction is instructed is less than a second displacement value, the first displacement and the second displacement being a displacement from a neutral position of the direction input device.

16. The control method according to claim 15, wherein it is determined that the traveling state is the turning state, when a first pilot pressure applied to a first port of the first hydraulic pump to drive the first hydraulic pump forward is substantially equal to a fourth pilot pressure applied to a fourth port of the second hydraulic pump to drive the second hydraulic pump backward, and an average of the first pilot pressure and the fourth pilot pressure is greater than a larger value of a second pilot pressure applied to a second port of the first hydraulic pump to drive the first hydraulic pump backward and a third pilot pressure applied to a third port of the second hydraulic pump to drive the second hydraulic pump forward, or when the second pilot pressure and the third pilot pressure are substantially equal to each other and an average of the second pilot pressure and the third pilot pressure is greater than a larger value of the first pilot pressure and the fourth pilot pressure.

17. The control method according to claim 1, wherein it is determined that the traveling state is the turning state, when an absolute value of a difference between a hydraulic pressure of a first connection port of the first hydraulic motor and a hydraulic pressure of a second connection port of the first hydraulic motor is equal to or more than a turning determination threshold pressure corresponding to the first rotational speed, hydraulic fluid for rotating the first traveling device in the forward direction being inputted to the first hydraulic motor through the first connection port, hydraulic fluid for rotating the first traveling device in the backward direction being inputted to the first hydraulic motor through the second connection port, when an absolute value of a difference between a hydraulic pressure of a third connection port of the second hydraulic motor and a hydraulic pressure at a fourth connection port of the second hydraulic motor is equal to or more than the turning determination threshold pressure, hydraulic fluid for rotating the second traveling device in the forward direction is inputted to the second hydraulic motor through the third connection port, hydraulic fluid for rotating the second traveling device in the backward direction is inputted to the second hydraulic motor through the fourth connection port, and when the hydraulic pressure of the first connection port is higher than the hydraulic pressure of the second connection port and the hydraulic pressure of the fourth connection port is higher than the hydraulic pressure of the third connection port, or when the hydraulic pressure of the second connection port is higher than the hydraulic pressure of the first connection port and the hydraulic pressure of the third connection port is higher than the hydraulic pressure of the fourth connection port.

18. The control method according to claim 1, wherein when rotational directions of the first hydraulic motor and the second hydraulic motor are opposite to each other and magnitude of the rotational speeds of the first hydraulic motor and the second hydraulic motor are within the range of rotational speeds estimated from the first rotational speed, it is determined that the traveling state is the turning state.

19. The control method according to claim 15, wherein the direction input device outputs a primary pilot pressure to be input to the direction input device to a first port of the first hydraulic pump to drive the first traveling device forward and a fourth port of the second hydraulic pump to drive the second traveling device backward when a displacement of the direction input device from a neutral position according to which a leftward movement is instructed is equal to or greater than the first displacement value; and wherein the direction input device outputs the primary pilot pressure to be input to the direction input device to a second port of the first hydraulic pump to drive the first traveling device backward and a third port of the second hydraulic pump to drive the second traveling device forward when the displacement of the direction input device from the neutral position according to which a rightward movement is instructed is equal to or greater than the first displacement value; and wherein the direction input device outputs the primary pilot pressure to be input to the direction input device to the first port and the third port when the displacement of the direction input device from the neutral position according to which a forward movement is instructed is equal to or greater than the second displacement value;

wherein the direction input device outputs the primary pilot pressure to be input to the direction input device to the second port and the fourth port when the displacement of the direction input device from the neutral position according to which a rearward movement is instructed is equal to or greater than the second displacement value; and wherein when it is determined that the traveling state is the turning state, the primary pilot pressure is set to be greater than a maximum volume threshold pressure of each of the first hydraulic pump and the second hydraulic pump when substantially no load is applied to the first hydraulic motor and the second hydraulic motor.

20. The control method according to claim 19, further comprising:

detecting a rotational speed of the engine, wherein when a difference between the first rotational speed and the rotational speed of the engine which is detected is smaller than a stall determination speed difference that is predetermined, a primary pilot pressure corresponding to the first rotational speed transitions in accordance with a first correspondence relationship;

wherein when the difference between the first rotational speed and the rotational speed of the engine which is detected is equal to or greater than the stall determination speed difference, the primary pilot pressure corresponding to the first rotational speed transitions in accordance with a second correspondence relationship;

wherein the primary pilot pressure based on the second correspondence relationship is lower than the primary pilot pressure based on the first correspondence at an identical value of the first rotational speed; and when a speed difference between the second rotational speed and the first rotational speed is larger than the stall determination speed difference; and wherein when it is determined that the traveling state is the turning state, the primary pilot pressure is controlled to a pressure corresponding to the second rotational speed based on the first correspondence relationship.

21. The control method according to claim 1, further comprising selecting one mode from among a plurality of modes having different ratios of the second rotational speed to the first rotational speed, wherein the second rotational speed is determined in accordance with the selected one mode.

22. The control method according to claim 21, wherein when a first mode, which is one of the plurality of modes, is selected, the rotation command to set the target rotational speed to the first rotational speed even if it is determined that the traveling state is the turning state.

23. The control method according to claim 3, further comprising selecting one mode from among a plurality of modes in which different predetermined ratios are set, wherein the predetermined ratio is determined according to the selected one mode.

24. The control method according to claim 7, further comprising selecting one mode from among a plurality of modes in which different combinations of the first ratio and the second ratio are set, wherein the first ratio and the second ratio are determined according to the selected one mode.

25. A work vehicle comprising:

a vehicle body having a first side surface and a second side surface facing the first side surface;

a first traveling device provided on the first side surface of the vehicle body;

a second traveling device provided on the second side surface of the vehicle body;

a first hydraulic motor to drive the first traveling device;

a second hydraulic motor to drive the second traveling device;

a first hydraulic pump connected to a first hydraulic motor via a first hydraulic circuit and having a first port and a second port, the first hydraulic pump being configured to supply hydraulic fluid to the first hydraulic motor via the first hydraulic circuit to drive the first traveling device forward when the pressure applied to the first port is higher than the pressure applied to the second port, the first hydraulic pump being configured to supply hydraulic fluid to the first hydraulic motor via the first hydraulic circuit to drive the first traveling device backward when the pressure applied to the second port is higher than the pressure applied to the first port;

a second hydraulic pump connected to a second hydraulic motor via a second hydraulic circuit and having a third port and a fourth port, the second hydraulic pump being configured to supply hydraulic fluid to the second hydraulic motor via the second hydraulic circuit to drive the second traveling device forward when the pressure applied to the third port is higher than the pressure applied to the fourth port, the second hydraulic pump being configured to supply hydraulic fluid to the second hydraulic motor via the second hydraulic circuit to drive the second traveling device backward when the pressure applied to the fourth port is higher than the pressure applied to the third port;

a pilot pump configured to supply pilot oil to the first hydraulic pump and the second hydraulic pump;

an engine configured to drive the first hydraulic pump, the second hydraulic pump, and the pilot pump;

at least one pilot oil passage connecting the pilot pump and the first hydraulic pump and connecting the pilot pump and the second hydraulic pump;

a hydraulic pressure adjustment mechanism provided in the at least one pilot oil passage and configured to adjust the pilot pressure of each of the at least one pilot oil passages to a target pilot pressure;

a direction input device configured to operate a traveling direction of the work vehicle by instructing forward or backward movement of at least one of the first traveling device and the second traveling device;

a sensor to detect operation of the direction input device; and a controller configured to determine whether or not the traveling state of the work vehicle is a turning state based on the operation of the direction input device, to output a rotation command to reduce the target rotational speed of the engine from a first rotational speed to a second rotational speed, and to control the hydraulic pressure adjustment mechanism such that the displacement volume of each of the first hydraulic pump and the second hydraulic pump to which the target pilot pressure is applied is maximized when substantially no load is applied to the first hydraulic motor and the second hydraulic motor.

26. The work vehicle according to claim 25, wherein the at least one pilot oil passage includes a first pilot oil passage connecting the direction input device and the first port, a second pilot oil passage connecting the direction input device and the second port, a third pilot oil passage connecting the direction input device and the third port, a fourth pilot oil passage connecting the direction input device and the fourth port, and a pilot supply oil passage connecting the pilot pump and the direction input device, and wherein the hydraulic pressure adjustment mechanism is a pilot control valve provided in the pilot supply oil passage and configured to adjust the pilot pressure of the pilot supply oil passage.

27. The control method according to claim 5, wherein the second rotational speed is determined to be equal to the first rotational speed when the roll angle is less than a predetermined first threshold angle.

28. The control method according to claim 27, wherein when the roll angle is equal to or greater than the first threshold angle and less than a second threshold angle larger than the first threshold angle, the second rotational speed is determined to be a value obtained by multiplying the first rotational speed by a first ratio that is predetermined, and wherein when the roll angle is equal to or greater than the second threshold angle, the second rotational speed is determined to be a value obtained by multiplying the first rotational speed by a second ratio which is predetermined and is smaller than the first ratio.

* * * * *